US009288113B2

(12) United States Patent
Lan et al.

(10) Patent No.: US 9,288,113 B2
(45) Date of Patent: Mar. 15, 2016

(54) METHOD AND DEVICE FOR ESTABLISHING STRUCTURE OF A COMMUNICATION NETWORK SYSTEM

(71) Applicant: THE PLA INFORMATION ENGINEERING UNIVERSITY, Zhengzhou (CN)

(72) Inventors: Jvlong Lan, Zhengzhou (CN); Jiangxing Wu, Zhengzhou (CN); Hongchang Chen, Zhengzhou (CN); Dongnian Cheng, Zhengzhou (CN); Yuxiang Hu, Zhengzhou (CN); Binqiang Wang, Zhengzhou (CN); Jing Wang, Zhengzhou (CN); Zhen Zhang, Zhengzhou (CN); Peng Wang, Zhengzhou (CN); Yiming Jiang, Zhengzhou (CN); Juan Shen, Zhengzhou (CN)

(73) Assignee: THE PLA INFORMATION ENGINEERING UNIVERSITY, Zhengzhou (CN)

( * ) Notice: Subject to any disclaimer, the term of this patent is extended or adjusted under 35 U.S.C. 154(b) by 17 days.

(21) Appl. No.: 14/334,703

(22) Filed: Jul. 18, 2014

(65) Prior Publication Data
US 2015/0023207 A1 Jan. 22, 2015

(30) Foreign Application Priority Data
Jul. 19, 2013 (CN) .......................... 2013 1 0307325

(51) Int. Cl.
*H04L 12/28* (2006.01)
*H04L 12/24* (2006.01)
*H04L 12/26* (2006.01)

(52) U.S. Cl.
CPC ............ *H04L 41/12* (2013.01); *H04L 43/0894* (2013.01)

(58) Field of Classification Search
CPC ......... H04L 41/00; H04L 41/12; H04L 41/14; H04L 43/00; H04L 43/04; H04L 43/08; H04L 43/0894
See application file for complete search history.

(56) References Cited

U.S. PATENT DOCUMENTS

| 2004/0052259 A1* | 3/2004 | Garcia | H04L 12/2602 370/392 |
| 2009/0138577 A1* | 5/2009 | Casado | H04L 41/06 709/220 |
| 2014/0325649 A1* | 10/2014 | Zhang | H04L 43/024 726/23 |

* cited by examiner

*Primary Examiner* — Anh Ngoc Nguyen
(74) *Attorney, Agent, or Firm* — Matthias Scholl, PC; Matthias Scholl

(57) ABSTRACT

A method and a device for establishing an information communication network system structure, as well as a server and a router. The method includes the steps of after establishing an initial service route, utilizing the server to periodically acquire current network resource configuration information and flow rate state information transmitted by each router node, and generating network resource view and network flow rate view; utilizing the server to acquire current real transmission performance of the initial service route according to the network resource view and the network flow rate view; including current real transmission performance and current business transmission requirement, and generating a reconstruction order when current real transmission performance does not match current business transmission requirement.

20 Claims, 6 Drawing Sheets

METHOD AND DEVICE FOR ESTABLISHING STRUCTURE OF A COMMUNICATION NETWORK SYSTEM

CROSS-REFERENCE TO RELATED APPLICATIONS

Pursuant to 35 U.S.C. §119 and the Paris Convention Treaty, the application claims the benefit of Chinese Patent Application No. 201310307325.X filed Jul. 19, 2013, the contents of which are incorporated herein by reference. Inquiries from the public to applicants or assignees concerning the document or the related applications should be directed to: Matthias Scholl P. C., Attn.: Dr. Matthias Scholl Esq., 245 First Street, 18$^{th}$ Floor, Cambridge, Mass. 02142.

BACKGROUND OF THE INVENTION

1. Field of the Invention

The present invention relates to the field of information technology, and in particular to a method and a device for establishing an information communication network system structure, as well as a server and a router.

2. Description of the Related Art

At present, the Internet technology has achieved great success in respect of completing basic communication tasks, and facilitates realizing data transmission.

In the prior art, the Internet technology establishes a data transmission service route mainly based on IP (Internet Protocol) addressing mode, that is, the router node determines the routing transmission route according to the IP address and realizes data transmission upon receipt of the business transmission requirement.

However, the inventor found in the research process of the application that, the existing Internet technology fails to meet the real requirement caused by business expansion, the network transmission ability is poorly adapted to the business requirement and it is hard to ensure the service quality of the network business.

SUMMARY OF THE INVENTION

The present invention aims to provide a method and a device for establishing an information communication network system structure, as well as a server and a router, so as to solve the above problem. The specific embodiments are as follows:

A method for establishing an information communication network system structure, the method comprising:
  Establishing an initial service route by a server, the server being disposed in a self-controlled domain; acquiring current network resource configuration information and flow rate state information periodically transmitted by each router node in the self-controlled domain, wherein the network resource configuration information comprises node resource and state information of the router node, topology information, and basic component information of network, and the flow rate state information comprises a business type and flow rate information carried by a link circuit corresponding to the router node;
  Generating network resource view and network flow rate view respectively according to current network resource configuration information and flow rate state information, wherein the network resource view comprises the resource information of each route node, each link state information, and topology connection information, and the network flow rate view comprises the flow rate information of the link circuit corresponding to each router node; and
  Acquiring current real transmission performance of the initial service route according to the network resource view and the network flow rate view, comparing current real transmission performance of the initial service route with current business transmission requirement, and generating a reconstruction order when the real transmission performance does not match the business transmission requirement, wherein the reconstruction order comprises current business transmission requirement information, the network resource view, and the network flow rate view, so that the router node receiving the reconstruction order reconstructs a service route, wherein the service route comprises a connectionless packet switching channel and a macro-circuit path of virtual connection.

Preferably, the steps of establishing the initial service route, comprising:
  Receiving the business transmission requirement by the server, wherein the business transmission requirement comprises network topology information and business transmission requirement information, analyzing and processing the business transmission requirement; dividing the business transmission requirement into a plurality of types according to the business transmission demand; and acquiring business type information corresponding to the business transmission requirement;
  Generating a resource cognition order and a flow rate state perception order, transmitting the resource cognition order and the flow rate state perception order to each router node in the self-controlled domain; receiving the resource cognition order and the flow rate state perception order by the router node, so that the router node respectively transmits current network resource configuration information and flow rate state information every other scheduled primary cycle and secondary cycle;
  Receiving the network resource configuration information and the flow rate state information, and generating corresponding network resource view and network flow rate view according to the network resource configuration information and the flow rate state information; and
  Transmitting the network resource view, the network flow rate view, the business transmission requirement and the business type information to each router node, so that the router node generates corresponding initial service route accordingly, wherein the initial service route comprises the connectionless packet switching channel and the macro-circuit path of virtual connection.

Accordingly, the present invention also discloses a method for establishing an information communication network system structure, the method comprising:
  Establishing an initial service route by a router node; acquiring current network resource configuration information and flow rate state information every other scheduled primary cycle and secondary cycle respectively by the router node, wherein the network resource configuration information comprises note state information of the router node, the topology information, and the basic component information of network, the flow rate state information comprises a business type and flow rate information carried by a link circuit corresponding to the router node; transmitting the network resource configuration information and the flow rate information to a server, so that the server generates network resource view and network flow rate view according to current network resource configuration information and flow rate state information; generating corresponding reconstruction order through the network resource view and the network flow rate view;

Receiving the reconstruction order transmitted by the server, wherein the reconstruction order comprises current business transmission requirement information, the network resource view, and the network flow rate view; and Reconstructing a service route according to the reconstruction order, wherein the service route comprises a connectionless packet switching channel and a macro-circuit path of virtual connection.

Preferably, the steps of establishing the initial service route comprises:

Sending the resource cognition order and the flow rate state perception order transmitted by the server to the router node;

Acquiring current network resource configuration information and flow rate state information every other scheduled primary cycle and secondary cycle respectively according to the resource cognition order and the flow rate state perception order, and transmitting current network resource configuration information and flow rate state information to the server; receiving the network resource configuration information and the flow rate state information by the server, so that the server generates corresponding network resource view and network flow rate view, wherein the network resource view comprises the resource information of each router node, various link state information, and the topology connection information, and the network flow rate view comprises the flow rate information of the link circuit corresponding to each router node; and Receiving the network resource view, the network flow rate view, the business transmission requirement information and the business type information transmitted by the server, and generating corresponding initial service route accordingly, wherein the initial service route comprises the connectionless packet switching channel and the macro-circuit path of virtual connection.

Preferably:

The connectionless packet switching channel, the basic data transmission channel realizing data transmission function by network in the form of the connectionless packet switching; and The macro-circuit path of virtual connection, the data transmission channel intelligently and dynamically established by network according to the application requirement and network state and with the macro-circuit as the basic data transmission mode, wherein the macro-circuit is a set of self-adaptive virtual circuits dynamically established by similar business flow with a common transmission route.

Preferably, when the established service route is a connectionless packet switching channel, the service route reconstruction according to the reconstruction order comprises:

Sending the reconstruction order transmitted by the server to the router node; determining the communication subject type corresponding to the business transmission according to current business transmission requirement information of the reconstruction order by the router node, and acquiring the identification value of data transmission terminal and data reception terminal corresponding to the communication subject type, wherein the communication subject type comprises location, identification, service, and content;

Determining the routing and addressing agreement according to the network resource view and the network flow rate view, as well as current business transmission requirement information, and acquiring corresponding transmission route through calculation according to the routing and addressing agreement; and Acquiring the forwarding information base corresponding to the communication subject type, loading the communication subject type identification of the router node determined by the transmission route in the forwarding information base, or loading the identification and service level information of the communication subject type corresponding to the router node determined by the transmission route when current business transmission requirement information comprises the service level information required for the business transmission, and establishing the connectionless packet switching channel through data transmission according to the forwarding information base.

Preferably, when current business transmission requirement information comprises the service level information required for the business transmission, corresponding transmission route acquired through calculation according to the routing and addressing agreement comprises:

Determining the business security requirements required for the business transmission according to the service level information, and formulating corresponding security scheme according to the business security requirements, wherein the security scheme comprises security service level, security mechanism and security technology required for the business transmission;

Determining the transmission route with security service function according to the security resource information of each routing node of the network resource view and the network flow rate view, as well as the security scheme; and Determining whether itself is the router node corresponding to the security service transmission route, and if so, configuring corresponding basic security processing module according to the security processing module configuration files stored in itself.

Preferably, when the established service route is the macro-circuit path of virtual connection, the service route reconstruction according to the reconstruction order comprises:

Sending the reconstruction order transmitted by the server to the router node, and acquiring the macro-circuit parameters of current business transmission requirement information according to current business transmission requirement information of the reconstruction order, wherein the macro-circuit parameters comprise the link circuit information, type and bandwidth requirements of the macro-circuit path of virtual connection to be established;

Determining whether the initial macro-circuit path of virtual connection meet the requirements of the macro-circuit parameters through adjustment according to the macro-circuit parameters in the reconstruction order; if so, adjusting the initial macro-circuit path of virtual connection, and acquiring the adjusted macro-circuit path of virtual connection;

Determining according to the judgment result that it is unable to meet the requirements of the macro-circuit parameters through specification adjustment, removing the initial macro-circuit path of virtual connection, and acquiring corresponding macro-circuit path of virtual connection through calculation according to the network resource view and the network flow rate view, as well as current business transmission requirement information; and Acquiring the label switching base corresponding to the macro-circuit path of virtual connection, loading the label of each link circuit determined by the transmission route in the label switching base, or loading the label and service level information of each link circuit determined by the transmission route when current business transmission requirement information comprises the service level information required for the business transmission, and establishing the macro-circuit path of virtual connection through data transmission according to the label switching base.

Preferably, when current business transmission requirement information comprises the service level information required for the business transmission, corresponding macro-circuit path of virtual connection is acquired through calculation according to the network resource view and the network flow rate view, as well as current business transmission requirement information, comprising:

Determining the business security requirements required for the business transmission according to the service level information, and formulating corresponding security scheme according to the business security requirements, wherein the security scheme comprises the security service level, the security mechanism and security technology required for the business transmission;

Determining the transmission route with security service function according to the security resource information of each routing node of the network resource view and the network flow rate view, as well as the security scheme; and Determining whether itself is the router node corresponding to the security service transmission route, and if so, configuring corresponding basic security processing module according to the security processing module configuration files stored in itself.

Accordingly, the present invention also discloses a device for establishing an information communication network system structure, comprising:

A receiving module, used to receive current network resource configuration information and flow rate state information periodically transmitted by each router node in the self-controlled domain after the first initial service route establishing module establishes the initial service route, wherein the network resource configuration information comprises the node resource and the state information of the router node, the topology information, and the basic component information of the network, and the flow rate state information comprises the business type and the flow rate information carried by the link circuit corresponding to the router node;

A view generating module, used to respectively generate the network resource view and the network flow rate view according to current network resource configuration information and flow rate state information, wherein the network resource view comprises the resource information of each router node, each link state information, and the topology information, and the network flow rate view comprises the flow rate information of the link circuit corresponding to each router node; and A reconstruction order generating module, used to acquire current real transmission performance of the initial service route according to the network resource view and the network flow rate view, compare the real transmission performance with current business transmission requirement, and generate the reconstruction order when the real transmission performance does not match the business transmission requirement, wherein the reconstruction order comprises current business transmission requirement information, the network resource view, and the network flow rate view, so that the router node receiving the reconstruction order reconstructs the service route, wherein the service route comprises the connectionless packet switching channel and the macro-circuit path of virtual connection.

Preferably, a first initial service route establishing module comprises:

A business transmission requirement receiving unit, used to receive the business transmission requirement, analyze and process the business transmission requirement, divide the business transmission requirement into a plurality of types according to the business transmission demand, and acquire the business type information corresponding to the business transmission requirement; wherein the business transmission requirement comprises the network topology information and the business transmission requirement information;

A router startup unit, used to generate resource cognition order and flow rate state perception order after receiving the business transmission requirement, and transmit the resource cognition order and flow rate state perception order to each router node in the self-controlled domain, so that the router node respectively transmits current network resource configuration information and flow state information every other scheduled primary cycle and secondary cycle after receiving the resource cognition order and the flow state perception order;

An initial view generating unit, used to receive the network resource configuration information and the flow rate state information, and generate corresponding network resource view and network flow rate view according to the network resource configuration information and the flow rate state information; and An initial service route establishing unit, used to transmit the network resource view, the network flow rate view, the business transmission requirement and the business type information to each router node, so that the router node generates corresponding initial service route accordingly, wherein the initial service route comprises the connectionless packet switching channel and the macro-circuit path of virtual connection.

Accordingly, the present invention also discloses a server, and a chip of the service is integrated with a device as mentioned above for establishing an information communication network system structure.

Accordingly, the present invention also discloses a device for establishing an information communication network system structure, the device comprising:

An information acquisition module, used to respectively acquire current network resource configuration information and flow rate state information every other scheduled primary cycle and secondary cycle after a second initial service route establishing module establishes an initial service route, and transmit network resource configuration information and flow rate information to a server, so that the server generates network resource view and network flow rate view according to current network resource configuration information and flow rate state information, and generates corresponding reconstruction order through the network resource view and the network flow rate view; wherein the network resource configuration information comprises node state information of router node, topology information, and basic component information of network, and the flow rate state information comprises a business type and the flow rate information carried by a link circuit corresponding to the router node;

A reconstruction order receiving module, used to receive the reconstruction order transmitted by the server, wherein the reconstruction order comprises current business transmission requirement information, the network resource view, and the network flow rate view; and A reconstruction module, used to reconstruct a service route according to the reconstruction order, wherein the service route comprises a connectionless packet switching channel and a macro-circuit path of virtual connection.

Preferably, the second initial service route establishing module comprises:

A receiving unit, used to receive resource cognition order and flow rate state perception order transmitted by the server;

An initial information acquisition module, used to respectively acquire current network resource configuration information and flow rate state information every other scheduled primary cycle and secondary cycle according to the resource cognition order and the flow rate state perception order, and transmit current network resource configuration information and flow rate state information to the server, so that the server generates corresponding network resource view and network flow rate view after receiving the network resource configuration information and the flow rate state information, wherein the network resource view comprises the resource information of each router node, each link state information, and topology connection information, and the network flow rate view comprises the flow rate information of the link circuit corresponding to each router node; and A second initial service route establishing unit, used to receive the network resource view, the network flow rate view, the business transmission requirement information and the business type information transmitted by the server, and generate corresponding initial service route accordingly, wherein the initial service route comprises the connectionless packet switching channel and the macro-circuit path of virtual connection.

Preferably, when the established service route is a connectionless packet switching channel, the reconstruction module comprises:

An order receiving unit, used to determine the communication subject type corresponding to the business transmission according to current business transmission requirement information of the reconstruction order after receiving the reconstruction order transmitted by the server, and acquire the identification value of data transmission terminal and data reception terminal corresponding to the communication subject type, wherein the communication subject type comprises location, identification, service, and content;

A first route acquiring unit, used to determine the routing and addressing agreement according to the network resource view and the network flow rate view, as well as current business transmission requirement information, and acquire corresponding transmission route through calculation according to the routing and addressing agreement; and A first establishing unit, used to acquire the forwarding information base corresponding to the communication subject type, load the identification of the communication subject type of the router node determined by the transmission route in the forwarding information base, or load the identification and service level information of the communication subject type corresponding to the router node determined by the transmission route when current business transmission requirement information comprises the service level information required for the business transmission, and establish a connectionless packet switching channel through data transmission according to the forwarding information base.

Preferably, when current business transmission requirement information comprises the service level information required for the business transmission, the first route acquiring unit comprises:

A first security scheme formulating subunit, used to determine the business security requirement required for the business transmission according to the service level information, and formulate corresponding security scheme according to the business security requirement, wherein the security scheme comprises security service level, security mechanism and security technology required for the business transmission;

A first determination subunit, used to determine the transmission route with security service function according to the security resource information of each routing node of the network resource view and the network flow rate view, as well as the security scheme; and A first configuration subunit, used to determine whether itself is the router node corresponding to the security service transmission route, and if so, configure corresponding basic security processing module according to the security processing module configuration files stored in itself.

Preferably, when the established service route is a macro-circuit of virtual connection, the reconstruction module comprises:

A second receiving unit, used to receive the reconstruction order transmitted by the server, and acquire macro-circuit parameters of current business transmission requirement information according to current business transmission requirement information of the reconstruction order, wherein the macro-circuit parameters comprise the link circuit information, type and bandwidth requirements of the macro-circuit path of virtual connection to be established;

A second judging unit, used to judge whether the initial macro-circuit path of virtual connection meet the requirements of the macro-circuit parameters through adjustment according to the macro-circuit parameters in the reconstruction order; if so, adjust the initial macro-circuit path of virtual connection, and acquire the adjusted macro-circuit path of virtual connection;

A second route acquiring unit, used to remove the initial macro-circuit path of virtual connection if it is determined according to the judgment result that it is unable to meet the requirements of the macro-circuit parameters through specification adjustment, and acquire corresponding macro-circuit path of virtual connection through calculation according to the network resource view and the network flow rate view, as well as current business transmission requirement information; and A second establishing unit, used to acquire the label switching base corresponding to the macro-circuit path of virtual connection, load the label of each link circuit determined by the transmission route in the label switching base, or load the label and service level information of each link circuit determined by the transmission route when current business transmission requirement information comprises the service level information required for the business transmission, and establish a macro-circuit path of virtual connection through data transmission according to the label switching base.

Preferably, when current business transmission requirement information comprises the service level information required for the business transmission, the second route acquiring unit comprises:

A second security scheme formulating subunit, used to determine the business security requirement required for the business transmission according to the service level information, and formulate corresponding security scheme according to the business security requirement, wherein the security scheme comprises the security service level, the security mechanism and security technology required for the business transmission;

A second determination subunit, used to determine the transmission route with security service function according to the security resource information of each routing node of the network resource view and the network flow rate view, as well as the security scheme; and A second configuration subunit, used to determine whether itself is the router node corresponding to the security service transmission route, and if so, configure corresponding basic security processing module according to the security processing module configuration files stored in itself.

Accordingly, the present invention also discloses a router, wherein, a chip of the server is integrated with the above device for establishing the information communication network system structure.

According to the above disclosed method for establishing the information communication network system structure, after establishing the initial service route, the server continues to periodically acquire current network resource configuration information and flow rate state information transmitted by each router node, and generate the network resource view and the network flow rate view; the server acquires current real transmission performance of the initial service route according to the network resource view and the network flow rate view; compare current real transmission performance and current business transmission requirement, and generate a reconstruction order when current real transmission performance does not match current business transmission requirement, so that the router node actuates the operation for reconstructing a service route after receiving the reconstruction order, the reconstructed service route is ensured to meet the function and performance requirement of network service, and the self-adaptive matching of the network transmission capacity and service requirement can be realized.

According to the scheme provided in the present invention, reconstructing a service route facilitates providing the business with a transmission channel adapted to the requirement and with quality and security guarantee. The communication network system structure established in the application is reconstructable and can realize self-adaptive dynamic adjustment and global optimization of the service features by the network structure and function, so as to improve the adaptability of the network transmission capacity to the business requirement, meet the real requirement caused by business expansion, and guarantee the service quality of network business.

In addition, the communication network system structure established in the scheme has a multidimensional cognition coordination mechanism, generates the network resource view and the network flow rate view corresponding to the self-controlled domain according to the network resource configuration information and the flow rate information acquired from each router node, and realize dynamic perception and intelligent collaboration between network and business and between a variety of unit functions within network based on the inherent ability such as self-learning, self-adaption, self-management and self-evolution from local to global network.

BRIEF DESCRIPTION OF THE DRAWINGS

Further description of the invention will be given below in conjunction with accompanying drawings, in which.

DETAILED DESCRIPTION OF THE EMBODIMENTS

Figure 1:
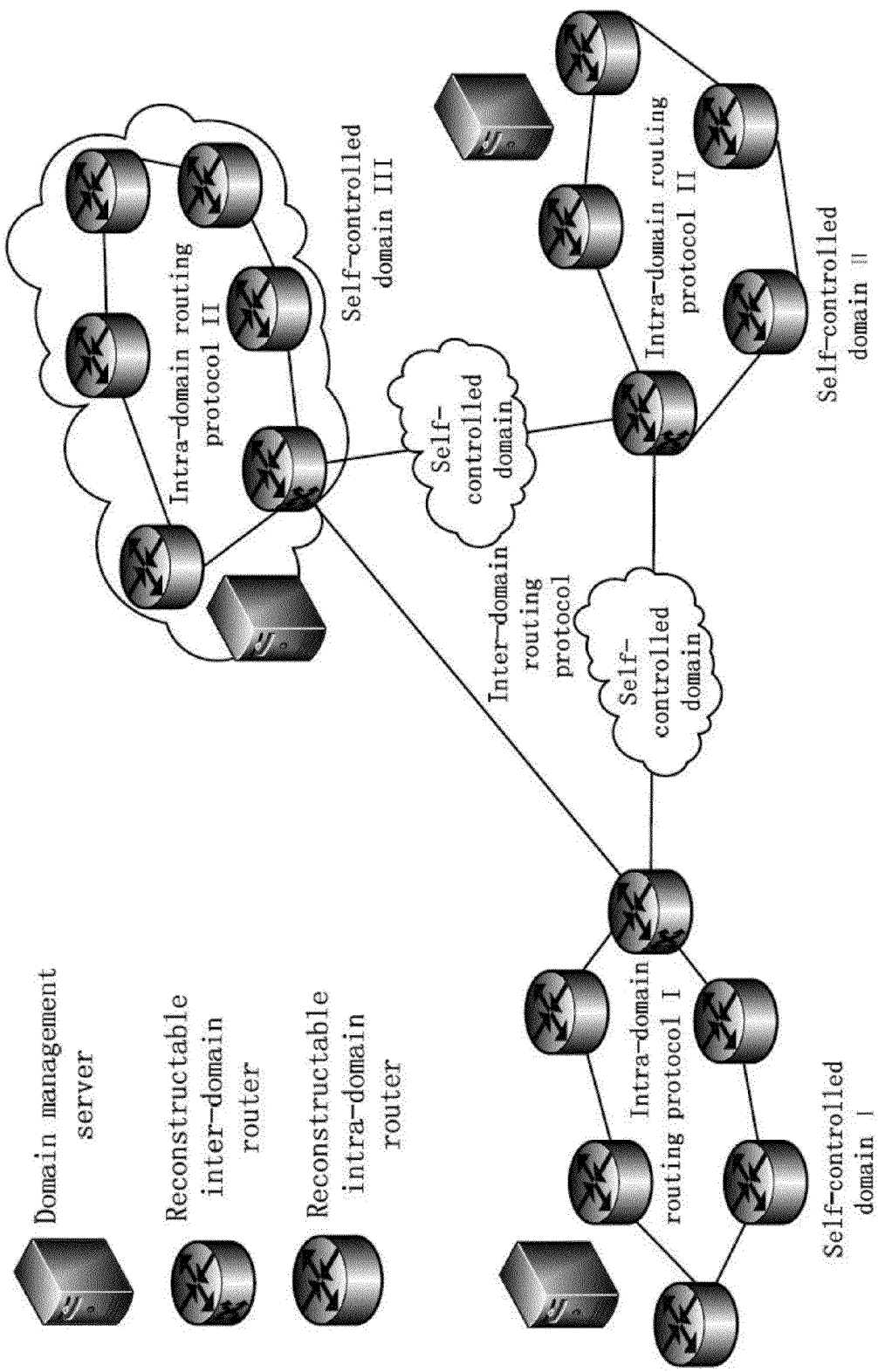
FIG. 1 shows a network structure diagram disclosed in the prior art.

The technical scheme in the embodiments of the present invention will be clearly and completely illustrated in the light of the drawings in the embodiments of the present invention as follows. Obviously, only part the embodiments in the present invention are provided, rather than all embodiments. All other embodiments obtained by the ordinary technical personnel in the field based on the embodiments in the present invention without making creative efforts fall within the protection scope of the present invention.

In the prior art, the Internet technology establishes a data transmission service route mainly based on IP (Internet Protocol) addressing mode, that is, the router node determines the routing transmission route according to the IP address and realizes data transmission upon receipt of the business transmission requirement.

However, the inventor found in the research process of the application that, the existing Internet technology fails to meet the real requirement caused by business expansion, the network transmission ability is poorly adapted to the business requirement and it is hard to ensure the service quality of the network business. The network system structure is established according to the IP addressing mode mainly using the service mode and system structure of "making the best efforts" and the service quality is poor in the process of business transmission.

In order to solve the problems that the network transmission ability is poorly adapted to the business requirement in the existing Internet technology, and it is hard to ensure the service quality of the network business, the application discloses a method for establishing an information communication network system structure.

In order to facilitate description of the present invention, first of all, the terms used in the scheme are defined as follows:

Connectionless packet switching channel: a basic data transmission channel for realizing the data transmission function by network in the form of connectionless packet switching.

Macro-circuit: a set of self-adaptive virtual circuits dynamically established by network for similar business flow with a common transmission route.

Macro-circuit path of virtual connection: a data transmission channel intelligently and dynamically established by network according to the application requirement and network state and with the macro-circuit as the basic data transmission mode.

Reconstruction: structural and functional reconstruction dynamically made by network in accordance with the business requirement.

Reconstructable router: a basic structure unit with reconstructable network, supporting a variety of access modes in the context of heterogeneous network, and realizing real separation of the data level from the control level within the router nodes.

Reconstructable service bearer network: dynamically adjustable and scalable special virtual network established on the basis of the reconstructable information communication network according to the network service deliverability, user needs and business characteristics, with the particularity oriented to the first-class business, and with highly flexible service ability.

Service route: It means the "node-link circuit" sequence across the entire network and satisfying the application transmission requirement, and is the optimal route selected by network to reach the objectives. The router node and link circuit thereon must be "able" to meet corresponding business requirement.

As can be seen from the network structure diagram in FIG. 1, the network usually consists of a plurality of self-controlled domains, each self-controlled domain consists of a reconstructable router, a management server and related link circuits, and different self-controlled domains are interconnected by interdomain routers.

The network function entities within a network comprise a reconstructable router and a management server, and the reconstructable router serves as a router node, and has the function of reconstructing a service route; wherein, the management server is responsible for perceiving, maintaining and updating the whole network state, global cognition of the network operation state, and distributed collaborative management through collaborative cognition, thereby forming a network resource view and a network flow rate. In addition, the management server is also responsible for intelligent reconstruction decisions, transmits a reconstruction order to the reconstructable router when the service route reconstruction is necessary, and is a server with management function.

The router node in the application is able to reconstruct a service route after receiving the reconstruction order transmitted by the server, and is usually referred to as the reconstructable router as a consequence, wherein the reconstructable router comprises intradomain reconfigurable routers and interdomain reconstructable routers. The intradomain reconstructable router is used to run intradomain routing protocol and macro-circuit protocol according to the reconstruction order, generate an intradomain service route meeting the business requirement through calculation, run the proxy modules related to resource cognition and state perception, and collect and monitor the running state of the underlying network device and the flow rate information in the link circuit. The interdomain reconstructable router runs the interdomain routing protocol and macro-circuit protocol, and generates a service route across self-controlled domains through calculation. The network management plane decides to rely on the connectionless packet switching channel or rely on the macro-circuit switching channel of virtual connection, or rely on the security service transmission route according to the network view, that is, the network resource view and the network flow rate view, and the business requirement.

In addition, the network system in the application mainly has three major basic functions as follows:

The network resource cognition, state perception, and business requirement configuration functions;

The service route management functions; and

The guaranteed data transmission function.

According to the above three major basic network functions, network is divided into three planes: data plane, control plane and management plane, wherein, the management plane is responsible for network perception and configuration, while the data plane provides the data transmission channel.

Specifically, the function operation of the management plane is carried out by the above management server, and has the function of acquiring the business transmission requirement, network resource configuration information and network running state information, usually acquires the network resource configuration information by the router node through state perception, and transmits such information to the management server; the network running state information mainly comprises the flow rate information, namely the business type and the flow rate information carried in each link circuit of network, is also usually acquired by the router node, and is transmitted to the management server; the management server can transmit network reconstruction orders to the control plane based on the reconstructable management strategy. That is to say, the management plane actuates the multidimensional network state perception and real-time resource cognition operation, and completes the intelligent reconstruction decision on the basis of both.

The function operation of the control plane is carried out by the above router node, runs the routing protocol and macro-circuit protocol according to the reconstruction order acquired from the management plane, calculates the service route, and implements specific service route reconstruction operation within network. The service route comprises a connectionless packet switching channel, a macro-circuit path of virtual connection, and/or a security service transmission route.

The function operation of the data plane is usually actuated by the above router node, and is used to implement specific data transmission according to the service route generated by the control plane.

All planes jointly complete establishment, adjustment and reconstruction of the service route within network through mutual communication and coordination, so as to realize the network running.

Embodiment 1

Figure 2:
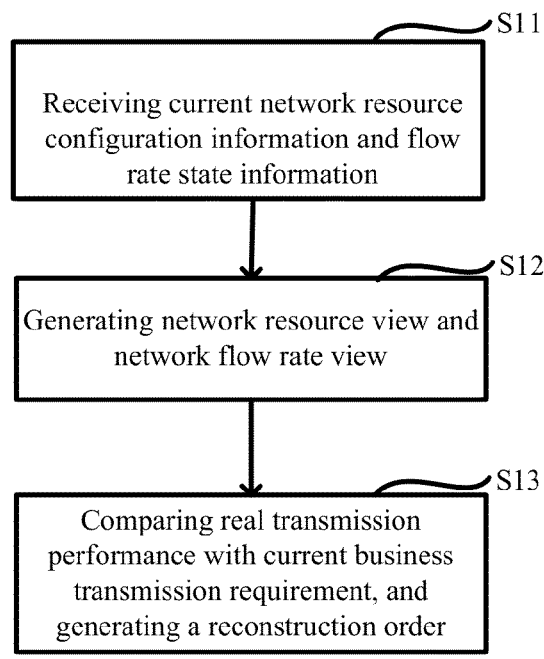
FIG. 2 shows a process flow diagram of a method for establishing an information communication network system structure disclosed in the embodiments of the present invention.

The embodiment 1 in the application discloses a method for establishing an information communication network system structure. The method is mainly applied to servers, as shown in the work flow diagram of FIG. 2, and comprises:

Step S11: Establishing an initial service route by a server, the server being disposed in a self-controlled domain; receiving current network resource configuration information and flow rate state information periodically transmitted by each router node in the self-controlled domain, wherein the network resource configuration information comprises node resource and state information of the router node, topology information, and basic component information of network, and the flow rate state information comprises a business type and flow rate information carried by a link circuit corresponding to the router node.

After receiving the business transmission requirement, the server will control the router nodes in the self-controlled domain to acquire and transmit current network resource configuration information and flow rate state information every other scheduled cycle, and control the router nodes to generate an initial service route according to the network resource configuration information and flow rate state information. In order to adapt to the diversity of business transmission, after establishing an initial service route, the server continues to receive current network resource configuration information and flow rate state information transmitted by each route node every other scheduled cycle.

The router node is equipped with a module for actuating the information acquisition function, which can acquire the required network resource configuration information through the internal communication protocol of node.

The topology information comprises the physical connection between the router node and other router nodes. If a self-controlled domain is associated, the topology information comprises the domain ID number of the correlated self-controlled domain and the flow rate information of the whole self-controlled domain, and comprises related information of the self-controlled domain, update timestamp of the router node, and adjacency relation, etc. The resource parameters of each resource associated with the node are stored in the node resource information. The resource comprises the router node resource component library, service chain combination state and resource occupancy state, etc., such as the total physical memory capacity, unoccupied core memory, unoccupied user memory, etc. that may be comprised in the memory of the router node. The node state information comprises whether the router node is in an active state, whether it is initialized, when it is initialized, and system log etc.; the basic component information of network comprises the routing protocol running state, queue resource scheduling status, address authentication information, business classification library, flow identification library, and address type library, etc.

Step S12: Generating network resource view and network flow rate view respectively according to current network resource configuration information and flow rate state information, wherein the network resource view comprises the resource information of each route node, each link state information, and topology connection information, and the network flow rate view comprises the flow rate information of the link circuit corresponding to each router node.

Specifically, the topology connection information recorded in the network resource view comprises the identification of its corresponding self-controlled domain, total size of the network resource view, size and starting position of each subdomain in the self-controlled domain, cognition time information, and network topology information, etc. The routing node resource information comprises the identification, IP, properties, processing capacity and load state of all nodes in the self-controlled domain. The link state information comprises the identification of all kink circuits in corresponding self-controlled domain, end node identification, attributes, transmission capacity and so on. The information of each link state corresponds to a business bearing state record, where the end node refers to the two router nodes connected to each link circuit.

The network flow rate view provides the flow rate information of all link circuits in the self-controlled domain of the server, comprising business type information and flow rate carried in every link circuit, is the standard output format of network state perception information and provides necessary basis for the network reconstruction decision. The flow rate information of the link circuit recorded in the network flow rate view comprises the business type of the flow rate carried in each link circuit of the self-controlled domain, proportion of the flow rate of each business type in the flow rate of the whole link circuit, and the transmission requirement of all kinds of business types. The business transmission requirement information comprises the node computing resource and link bandwidth resource required for the business transmission, service transmission quality requirement, service transmission security requirement, service network topology description, etc., wherein, different transmission business has different business transmission requirements. For example, if the business service level requirement is not high, the business transmission requirement only needs to comprise the node computing resource and link bandwidth resource required for the business transmission, and the service level comprises the service quality and security level; when the business service level requirement is high, the business transmission requirement shall also comprise the service transmission quality requirement, and/or service transmission security requirement. In addition, when it is necessary to establish a service bearer network in case of more transmission business, the business transmission requirement shall at least comprise the node computing resource and link bandwidth resource required for the business transmission and service network topology description information.

Step S13: Acquiring current real transmission performance of the initial service route according to the network resource view and the network flow rate view, comparing current real transmission performance of the initial service route with current business transmission requirement, and generating a reconstruction order when the real transmission performance does not match the business transmission requirement. The reconstruction order comprises current business transmission requirement information, the network resource view, and the network flow rate view, so that the router node receiving the reconstruction order reconstructs a service route, wherein the service route comprises a connectionless packet switching channel and a macro-circuit path of virtual connection.

In the process of business transmission, the user need changes, if any, will result in changes of current business transmission requirement, or great changes of the router node running state will lead to changes of current real transmission performance of a previously established initial service route. Both may lead to mismatching of current real transmission performance of the established initial service route and current business transmission requirement, so that network reconstruction is necessary.

In addition, current business transmission requirement can be acquired by the users through inputting current business transmission requirement into the server; or by way of the network state perception, in the case, the server will acquire the business type information corresponding to the business transmission requirement in advance through analysis processing according to the received transmission requirement, and transmit the business type information to the router node. After receiving the business type information, the router node acquires the business transmission requirement with same business type as it through state perception, and transmits the business transmission requirement to the server.

Network reconstruction means a dynamic process of structural and functional reconstruction according to the business requirement and multidimensional network view, wherein, the multidimensional network view refers to the network resource view and the network flow rate view. Through state perception, current network resource view is acquired. Through resource cognition, current network flow rate view is acquired. Then based on the state perception and resource cognition, network reconstruction dynamically adjusts the network service to meet all fitting operations of the business requirement change, and outputs a reconstruction order to the control plane, namely the router node, through the reconstruction strategy management module in the management plane, namely the server. The network reconstruction facilitates solving the problem that the network service ability does not match with the increasing function and performance requirement of the network business. The server usually transmits the reconstruction order in the form of broadcasting, so that all router nodes in the self-controlled domain as the server can acquire the reconstruction order.

Specifically, the method for the server to provide the reconstruction order comprises first acquiring the real transmission performance of the previously established initial service route from current network resource view and network flow rate view; then utilizing the server to compare current real transmission performance and business transmission requirement, generate a reconstruction order, and transmit the reconstruction order to the router node, so that the router node establishes a service route through recalculation, satisfies the function and performance requirement of network business, and realizes the self-adaptive matching of the network transmission capacity and service requirement.

In the step, it is necessary to determine whether to generate a reconstruction order through reconstruction judgment. In the application, usually the double reconstruction threshold judgment technology is used to determine whether the reconstruction threshold is reached, wherein, the double reconstruction threshold comprises the threshold of increasing resource allocation and the threshold of decreasing resource allocation. In the case, the module in the server for actuating the reconstruction judgment function determines whether the reconstruction threshold is reached through comparing the real transmission performance of the initial route and business transmission requirement according to the preset double reconstruction threshold corresponding to the transmission business (that is, the threshold of increasing resource allocation and the threshold of decreasing resource allocation): if the reconstruction threshold is reached, the module transmits a reconstruction order to the router node; otherwise, it continues to periodically generate the network resource view and the network flow rate view.

According to the above disclosed method for establishing an information communication network system structure, after establishing an initial service route, the server continues to periodically acquire current network resource configuration information and flow rate state information transmitted by each router node, and generate the network resource view and the network flow rate view. Through the network resource view and network flow state view, the server acquires current real transmission performance of the initial service route; compares current real transmission performance and current business transmission requirement, and generates a reconstruction order in case of mismatching between both, so that the router node actuates the operation for service route reconstruction after receiving the reconstruction order, the reconstructed service route is ensured to meet the function and performance requirement of network service, and the self-adaptive matching of the network transmission capacity and service requirement can be realized.

According to the scheme provided in the present invention, reconstructing a service route facilitates providing the business with a transmission channel adapted to the requirement and with quality and security guarantee. The communication network system structure established in the application is reconstructable and can realize self-adaptive dynamic adjustment and global optimization of the service features by the network structure and function, so as to improve the adaptability of the network transmission capacity to the business requirement, meet the real requirement caused by business expansion, and guarantee the service quality of network business.

In addition, the communication network system structure established in the scheme has a multidimensional cognition coordination mechanism, generates the network resource view and the network flow rate view corresponding to the self-controlled domain according to the network resource configuration information and the flow rate information acquired from each router node, and realize dynamic perception and intelligent collaboration between network and business and between a variety of unit functions within network based on the inherent ability such as self-learning, self-adaption, self-management and self-evolution from local to global network.

Furthermore, the reconstructed service route comprises a connectionless packet switching channel and a macro-circuit path of virtual connection, so as to support highly efficient and flexible adaptation of network to business from the perspective of basic and core function.

In addition, after the step S13, the method disclosed in the application may further comprise:

The server tracks the business transmission quality after reconstruction, evaluates the practical effects of the reconstruction operation, and records the evaluation results in the knowledge base, in order to facilitate leaning of the module in the server for actuating the reconstruction decision, wherein, the knowledge base may be realized in the form of the database in the server or files stored in the management server in a user-defined format.

The practical effect of the reconstruction operations is acquired mainly through the network resource view and the network flow rate view generated by the server according to the service route reconstruction. The practical effect of the reconstruction operations can be acquired by acquiring the transmission performance after the service route reconstruction through the network resource view and the network flow rate view.

Figure 3:
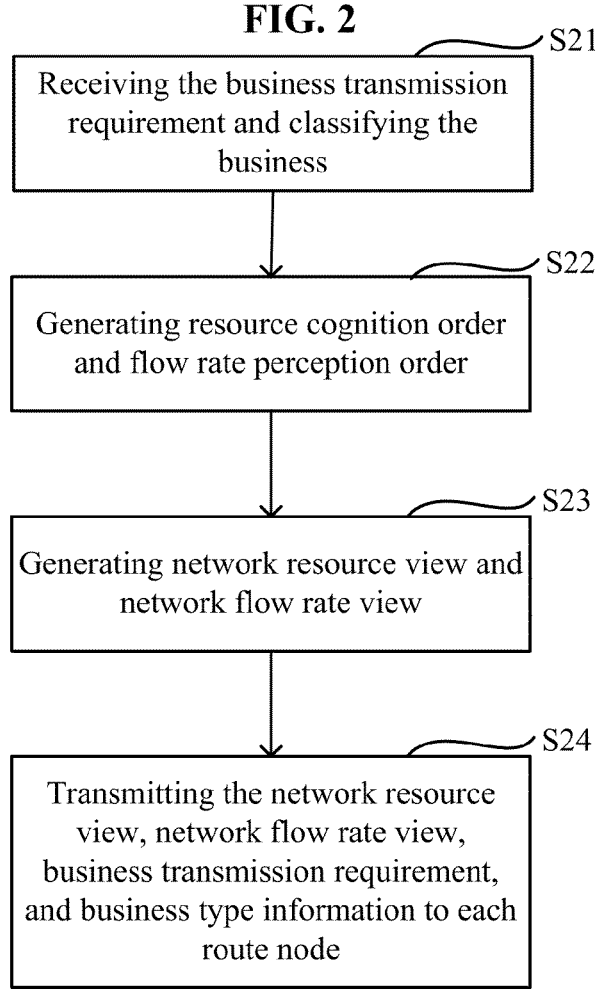
FIG. 3 shows a process flow diagram for establishing an initial route according to the method for establishing an information communication network system structure disclosed in the embodiments of the present invention.

In addition, in the embodiment, as can be seen from the work flow diagram in FIG. 3, the steps of establishing the initial service route in step S11 comprises:

Steps S21: Receiving the business transmission requirement by the server, wherein the business transmission requirement comprises network topology information and business transmission requirement information; analyzing and processing the business transmission requirement; dividing the business transmission requirement into a plurality of types according to the business transmission demand; and acquiring the business type information corresponding to the business transmission requirement.

The business transmission requirement information comprises the node computing resource and link bandwidth resource required for the business transmission, service transmission quality requirement, service transmission security requirement, service network topology description, etc. Different transmission business has different business transmission requirements. For example, if the business service level requirement is not high, the business transmission requirement only needs to comprise the node computing resource and link bandwidth resource required for the business transmission, and the service level comprises the service quality and security level; when the business service level requirement is high, the business transmission requirement shall also comprise the service transmission quality requirement, and/or service transmission security requirement. In addition, when it is necessary to establish a service bearer network in case of more transmission business, the business transmission requirement shall at least comprise the node computing resource and link bandwidth resource required for the business transmission and service network topology description information.

The business type division is realized mainly by using a particular clustering algorithm. The same type of business service usually has similar transmission quality requirement.

At present, there are a variety of very mature clustering algorithms. The service requirement type is obtained through calculation as per the clustering algorithm. The number of types may be specified by the algorithm parameters in advance, and may also be obtained through automatic calculation by the algorithm. The type division standard mainly comprises the QoS requirement, the parameters of which comprise the service priority level, time delay level, reliability level, peak throughput level, and average throughput level, etc.

The service classification plays a role in statistical analysis of the running network service, and targeted optimization of some service types according to the statistical analysis results. For example, the macro-circuit path of virtual connection has very high transmission bandwidth, but is established in a complex process. Therefore, usually only when there are a group of similar business with a common transmission route, will a macro-circuit path of virtual connection be established. In the case, it is necessary to divide the business transmission requirement into different types. Under the circumstances, when there is a transmission business of the same type and with very high bandwidth requirement, a macro-circuit path of virtual connection may be established.

In addition, the same type of business service usually has similar transmission quality requirement, so the server can acquire the business transmission requirement of the transmission business through searching the business transmission requirement of same business type after acquiring the business type information corresponding to the business transmission requirement.

Step S22: Generating a resource cognition order and a flow rate state perception order, transmitting the resource cognition order and the flow rate state perception order to each router node in the self-controlled domain; receiving the resource cognition order and the flow rate state perception order by the router node, so that the router node respectively transmits current network resource configuration information and flow rate state information every other scheduled primary cycle and secondary cycle.

After receiving the business transmission requirement, the server generates the resource cognition order and flow rate state perception order, and transmits the orders to the router node, so that the router node periodically acquires and transmits the network resource configuration information and flow rate state information to the server.

The primary cycle and the secondary cycle may have the same time value, namely the router node transmits the network resource configuration information and flow rate state information in the same cycle, and may also have different time value.

Step S23: Receiving the network resource configuration information and the flow rate state information, and generating corresponding network resource view and network flow rate view according to the network resource configuration information and the flow rate state information.

Step S24: Transmitting the network resource view, the network flow rate view, the business transmission requirement and the business type information to each router node, so that the router node generates corresponding initial service route accordingly, wherein the initial service route comprises the connectionless packet switching channel and the macro-circuit path of virtual connection.

The scheme disclosed in the above steps S21-S24 shows a method for the server to establish the initial service route. According to the method, after receiving the business transmission requirement, the server acquires the type of the transmission business through analysis, and generates the resource cognition order and flow rate state perception order, in order to start the router node state perception and resource cognition process, and acquire the network resource configuration information and flow rate state information transmitted by the router node; generate corresponding network resource view and network flow rate view according to the network resource configuration information and flow rate state information; and transmit the network resource view, the network flow rate view, the business transmission requirement and the business type information to each router node, so that the router node establishes an initial service route through calculation of the route.

According to the method, the established initial service route matches with the business transmission requirement information comprised in the business transmission requirement, and facilitates business transmission with high quality.

Embodiment 2

Figure 4:
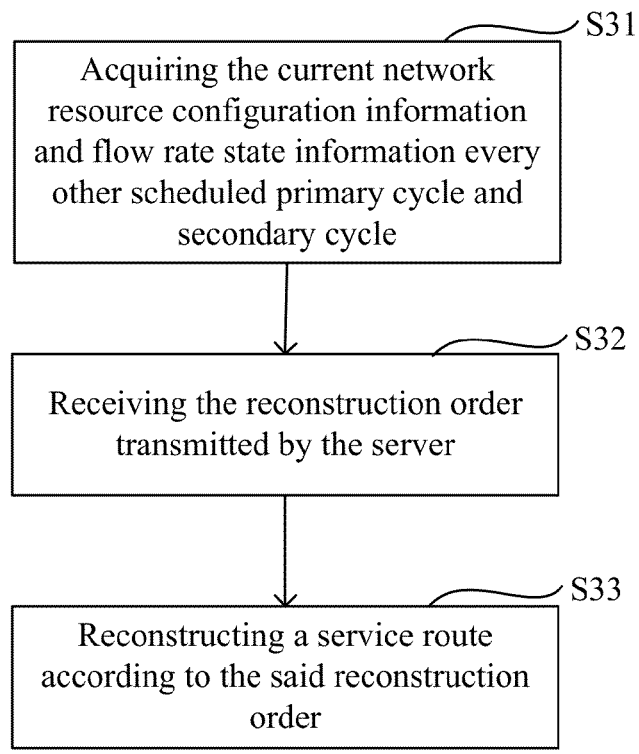
FIG. 4 shows a process flow diagram of a second method for establishing an information communication network system structure disclosed in the embodiments of the present invention.

The embodiment discloses a method for establishing an information communication network system structure, which is mainly applied to routers, as shown in the work flow diagram of FIG. 4. The method for establishing an information communication network system structure comprises:

Step S31: Establishing an initial service route by a router node; acquiring current network resource configuration information and flow rate state information every other schedule primary cycle and secondary cycle by the router node, wherein the network resource configuration information comprises node state information of the router node, topology information and basic component information of network, and the flow rate state information comprises a business type and flow rate information carried by a link circuit corresponding to the router node; transmitting the network resource configuration information and the flow rate state information to a server, so that the server generates network resource view and network flow rate view according to current network resource configuration information and flow rate state information; generating corresponding reconstruction order through the network resource view and the network flow rate view.

The primary cycle and the secondary cycle may have the same or different time value, which is not defined in the present invention.

The topology information in the network resource configuration information comprises the physical connection between the router node and other router nodes. If a self-controlled domain is associated, the topology information comprises the domain ID number of the correlated self-controlled domain and the flow rate information of the whole self-controlled domain, and stores related information of the self-controlled domain, update timestamp of the router node, and adjacency relation, etc. The resource parameters of each resource associated with the node are stored in the node resource information. The resource comprises the router node resource component library, service chain combination state and resource occupancy state, etc., such as the total physical memory capacity, unoccupied core memory, unoccupied user memory, etc. that may be comprised in the memory of the router node. The node state information comprises whether the router node is in an active state, whether it is initialized, when it is initialized and system log, etc.; the basic component information of network comprises the routing protocol running state, queue resource scheduling status, address authentication information, business classification library, flow identification library, and address type library, etc.

The process of acquiring the network resource configuration information is a process of network resource cognition, and is used to collect, describe and share the software and hardware information of current physical network, so that the server generates the network resource view.

The route node actuates the operation of acquiring the network resource configuration information mainly through two steps: information collection and resource description, wherein, the information collection means to acquire the initial network resource configuration information through the communication protocol established in the route node; the resource description is used to realize complete description of the router node resource, and formalized and quantitative description of the underlying network resource.

According to the way of resource property description in Table 1, in view of different resource types corresponding to the initial network resource configuration information, and through the description mode provided in Table 1, data resources, such as the basic resource, computing resource, storage resource and communication resource metadata, are defined to achieve the process of complete description of the node resource information.

TABLE 1

| | Resource property description | |
|---|---|---|
| | Resource name | Property description |
| Basic resource | Resource identification | Resource identification provided by the resource creator or resource provider |
| | Resource name | Resource identification provided by the resource creator or resource provider |
| | Resource type | Computing, storage and communication resource |
| | Resource provider | A service agency providing resources |
| | Brief description of resources | Text description of resource information |
| | Registration time of resources | Related date when resources become available |
| Computing resource | Processor type | Processor type |
| | Number of processors | Number of available processors |
| | General computing power of processor | General computing power of processor |
| | Use ratio of processor | Computing power distributed to each bearer network |
| Storage resources | Storage type | Comprising hard disks, memory, Cache, TCAM, SRAM, etc. |
| | File system type | Comprising NTFS, FAT32, etc. |
| | Memory capacity | Memory size |
| | Use ratio of memory | Storage capacity distributed to each bearer network |
| Communication resource | Bandwidth capacity | Total bandwidth size |
| | Use ratio of bandwidth | Bandwidth size distributed to each bearer network |

Through information collection and resource description, the router node acquires the network resource configuration information in a specific format, and transmits the network resource configuration information to the server, so that the server generates the network resource view according to the network resource configuration information.

The flow rate state information acquisition is realized by the router node through periodically acquiring the flow rate business information of each link circuit, comprising two steps: flow rate sampling and business identification. The steps of flow rate sampling and business identification will be conducted on each route switching node. The flow rate state information acquired through the flow rate monitoring will be collected by each router node to the server in the self-controlled domain to facilitate description of the business classification and the network flow rate view by the server.

The flow rate sampling means to sample and extract the data packet in the network link, collect the extracted data packet into data flow, and statistically collect the feature information of each data stream. The flow rate sampling acquires the composition of network flow rate in different feature dimensions by way of message sampling, such as business composition, user composition, etc. On the premise of meeting certain measurement precision, the flow rate sampling measurement technology can not only greatly reduce the size of the flow rate measurement record file, but also reduce the load caused by the measurement process to the system, and is more applicable to real-time statistics and analysis of flow rate in high speed network.

Business identification refers to identification of the business type corresponding to the data flow. Business identification usually comprises the classification based on flow identification and business perception based on flow rate statistics.

The flow identification is used to reflect the user service request vector, comprising the service quality (comprising 8-bit identification) and security (comprising 12-bit identification). According to the service quality requirements, the 8-bit flow identification is defined as 16 service quality requirements, and can support 256 kinds of service quality extension. In accordance with the security service requirements, 12-bit flow identification comprises the defined security service requirements, can support security service extension, and totally supports 4,096 kinds of security services. In business transmission, flow identification in the acquisition network facilitates acquiring the business type.

In addition, the business identification may also be realized on the basis of business perception of flow statistics. The business identification framework identifies the network flow business type with the flow information after network sampling as the input data, and comprehensively using the deep packet inspection and deep flow inspection technology, and introduces the feedback mechanism and retraining mechanism, in order to improve the identification speed and accuracy, wherein, the deep packet inspection technology directly matches the data packet load of unknown flow rate with the load characteristics of known application, so as to realize the flow rate classification. The deep flow detection technology divides the flow rate into different business types mainly using the machine learning algorithm according to the statistical characteristics of flow (e.g., business flow duration, average flow rate, bytes, etc.).

The router node periodically acquires the flow rate business information in each link circuit, acquires the flow rate state information through flow rate sampling and business identification, and transmits the flow rate state information to the server, so that the server generates the network flow rate view in the self-controlled domain according to the flow rate state information.

Step S32: Receiving the reconstruction order transmitted by the server, wherein the reconstruction order comprises current business transmission requirement information, the network resource view and the network flow rate view.

Reconstruction means to dynamically adjust network services to meet the business requirement changes based on state perception and resource cognition. When the real transmission performance of the initial route is different from the business transmission requirement, the server generates a reconstruction order, and transmits the reconstruction order to the router node.

Step S33: Reconstructing a service route according to the reconstruction order, wherein the service route comprises a connectionless packet switching channel and a macro-circuit path of virtual connection.

The connectionless packet switching channel is a basic data transmission channel realizing the data transmission function by network in the form of connectionless packet switching; the macro-circuit path of virtual connection is a data transmission channel intelligently and dynamically established by network according to the application requirement and network state and with the macro-circuit as the basic data transmission mode, wherein the macro-circuit is a self-adaptive virtual circuit dynamically established by a set of similar business flows with a common transmission route.

Figure 5:
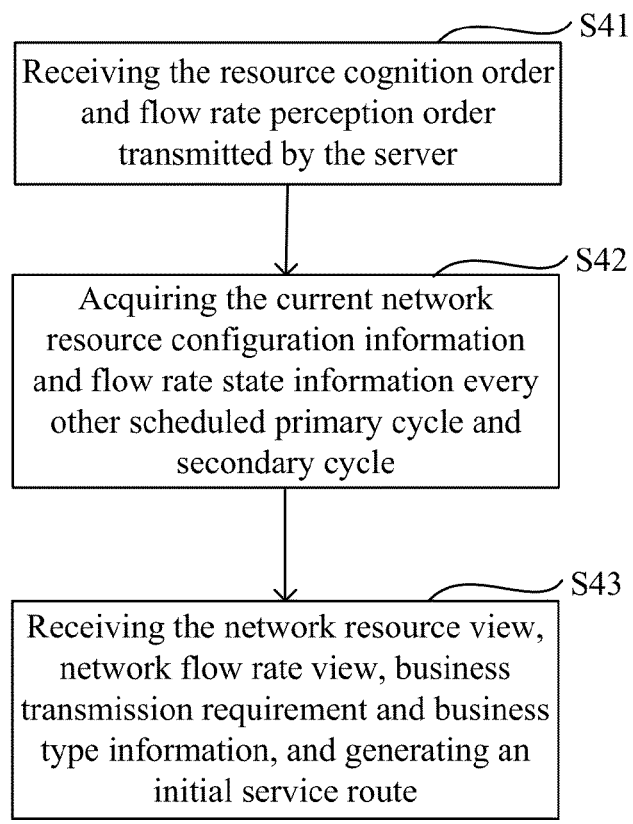
FIG. 5 shows a process flow diagram for establishing an initial route according to the second method for establishing an information communication network system structure disclosed in the embodiments of the present invention.

In addition, according to the structural diagram in FIG. 5, the embodiment also discloses a method for establishing an initial service route, comprising:

Step S41: Sending the resource cognition order and the flow rate state perception order transmitted by the server to the router node;

Step S42: Acquiring current network resource configuration information and flow rate state information every other scheduled primary cycle and secondary cycle respectively according to the resource cognition order and the flow rate state perception order, and transmitting current network resource configuration information and flow rate state information to the server, so that the server generates corresponding network resource view and network flow rate view, wherein the network resource view comprises the resource information of each router node, various link state information and the topology connection information, and the network flow rate view comprises the flow rate information of the link circuit corresponding to each router node;

Step S43: Receiving the network resource view, the network flow rate view, the business transmission requirement information and the business type information transmitted by the server, and generating corresponding initial service route accordingly, wherein the initial service route comprises the connectionless packet switching channel and the macro-circuit path of virtual connection.

The method disclosed in Step S41 and Step S43 establishes an initial service route, where the initial service route matches with current business requirement, and has very high service quality.

Furthermore, in Step S33, the service route reconstructed according to the reconstruction order comprises a plurality of forms, such as the connectionless packet switching channel and macro-circuit path of virtual connection.

When the established service route is a connectionless packet switching channel, the service route reconstruction according to the reconstruction order comprises:

Firstly, after receiving the reconstruction order transmitted by the server, the router node determines the communication subject type corresponding to the business transmission according to current business transmission requirement information of the reconstruction order, and acquires the identification value of the data transmission terminal and data reception terminal corresponding to the communication subject type, wherein the communication subject type comprises the location, the identification, the service and the content.

When it is necessary to establish a connectionless packet switching channel, current business transmission requirement information comprises the communication subject type corresponding to the business transmission.

The application establishes a connectionless packet switching channel using the network routing and addressing mechanism driven by service, supporting coexistence of a variety of network system structures, satisfying a variety of application requirements and with a variety of running states. Different from the traditional routing and addressing, the routing and addressing method in the present invention can support data communication in 4 different networks, namely the IP network, host-centered network, service-centered network and content-centered network.

In the present invention, the communication subject type is used as the identification to replace the traditional IP address for data transmission, wherein, the communication subject type disclosed in the application comprises the location, the identification, the service and the content with corresponding location identification (LID), host identification (HID), service identification (SID) and content identification (CID). The data transmission terminal required for data transmission will inform the access router of the communication subject corresponding to the data transmission, as well as the specific identification value corresponding to the communication subject.

When a new network is accessed to the server, an application is filed to the identification allocation and management server in the network domain in advance. The identification allocation and management server will allocate an identification corresponding to each communication subject type to the network, and inform the server of the allocated identification. When data transmission is necessary, the server will load the identification of the communication subject type corresponding to the data transmission business, as well as the identification value corresponding to the data transmission terminal and data reception terminal, in the generated data transmission requirement.

The identification value of the router node is an IP address when the communication subject is a location, is a host identity information when the communication subject is a host, is the coding result of the provided service name when the communication subject is a service, and is the coding result of the provided content name when the communication subject is a location.

The LID means location identification, which is used for location-centered addressing, and achieves the purpose of communication through interaction between two locations with the location as the network communication subject. In the case, the identification value of the data transmission terminal and data reception terminal corresponding to the communication subject type is respectively the location information of the data transmission terminal and data reception terminal.

HID means host identification, which is used for host-centered addressing, and achieves the purpose of communication through interaction with the host and acquiring contents or services with the host as the network communication subject. In the case, if the identification is separated from location, HID only shows the host identity, corresponding identification value is the subject identification, instead of the location. If the identification is not separated from location, HID is the IP address of the host.

SID means the service identification, which is used for service-centered addressing, is a means for direct expression of communication intention, eliminates the switching redundancy from the service name to the network layer address, and directly takes the service identification as the basis for network addressing. When the communication subject is SID, the identification value of the data transmission terminal and data reception terminal is the coding result of the provided service name.

CID means the content identification, which is used for content-centered addressing, and is mainly used when the content is the network communication subject. During data transmission, sometimes users pay more attention to the content of the data transmission terminal and data reception terminal, and need addressing oriented to data contents. In the case, the identification value of the data transmission terminal and data reception terminal is established as the coding result of the content name provided by the data transmission terminal and data reception terminal with the content as the network communication subject.

Secondly, the routing and addressing agreement is determined according to the network resource view and the network flow rate view, as well as current business transmission requirement information, and corresponding transmission route is acquired through calculation according to the routing and addressing agreement.

The routing and addressing agreement required for the service route reconstruction is determined according to the network resource view and the network flow rate view, as well as current business transmission requirement information; corresponding routing calculation method is determined after determining the communication subject type corresponding to the business transmission, and the transmission route is acquired through calculation according to the routing and addressing agreement and the routing calculation method.

Thirdly, acquiring the forwarding information base corresponding to the communication subject type, loading the communication subject type identification of the router node determined by the transmission route in the forwarding information base, or loading the identification and service level information of the communication subject type corresponding to the router node determined by the transmission route when current business transmission requirement information comprises the service level information required for the business transmission, and establishing a connectionless packet switching channel through data transmission according to the forwarding information base.

When the established service route is a connectionless packet switching channel, it is necessary to realize routing and addressing according to the communication subject type. Under the circumstances, the router node is required to know about the communication subject type identification of each other router node in the self-controlled domain Therefore, when a new server is accessed to the network, it actuates the operation released by the communication subject. That is, each router node transmits the communication subject type supported by itself and the identification name of the communication subject type corresponding to itself in the form of broadcasting, so that each router node and server in the self-controlled domain acquire the communication subject type supported by each router node and the identification name. In the header of the message released by the router node for the communication subject, different routing identification fields are used to distinguish between and support the information released by different communication subject types.

In addition, when the business transmission requirement information comprises the service level information required for the business transmission, each router node shall also inform the server within the self-controlled domain of their own link state information, as well as the service ability and security level that can be provided by themselves, so as to facilitate dynamically establishing a service route satisfying the business and application requirement of different service categories and security levels. In the case, the transmission route acquired through calculation according to the routing and addressing agreement determined according to current business transmission requirement information shall still meet the needs of the business transmission for the service level, wherein, the service level comprises the service quality and security level. In the case, the routing forwarding base comprises the communication subject type identification required for the business transmission, and is also loaded with the service level identification required for the business transmission. Through introduction of the service level, the routing forwarding base can provide a service route satisfying the business and application requirement of different service quality and security level requirements, and solves current problems of Internet in respect of the service quality and security, etc.

When current business transmission requirement information only comprises the link bandwidth information required for business transmission, the acquired forwarding information base only needs to load the communication subject type identification of the router node determined by the transmission route. In the process of data transmission, message addressing is forwarded according to the communication subject type identification in the forwarding information base.

In the message addressing forwarding, if current business transmission requirement information only comprises the link bandwidth information required for business transmission, it is only necessary to find the target identification through list processing according to the communication subject type identification loaded therein, and to determine the next-hop router node according to the communication subject type identification of the target node. If current business transmission requirement information comprises the link bandwidth information and service level required for business transmission, it is necessary to find not only the communication subject type identification of the target node, but also the service level, so as to determine the forwarded next-hop router node according to both the target node and service level.

When current business transmission requirement information comprises the service level information required for the business transmission, corresponding transmission route acquired through calculation according to the routing and addressing agreement comprises:

Firstly, determining the business security requirement required for the business transmission according to the service level information, and formulating corresponding security scheme according to the business security requirements, wherein the security scheme comprises security service level, security mechanism and security technology required for the business transmission;

Secondly, determining the transmission route with security service function according to the security resource information of each routing node of the network resource view and the network flow rate view, as well as the security scheme; and Finally, determining whether itself is the router node corresponding to the security service transmission route, and if so, configuring corresponding basic security processing module according to the security processing module configuration files stored in itself, wherein, the basic security processing module comprises an encryption processing module, a hash processing module, and/or a signature algorithm processing module.

The basic security processing module refers to the basic security components in a router node. The software module in a router node mainly refers to the smallest functional unit for realizing network security, and is the basis for supporting network security function extension and service customization. The security processing module disclosed in the application comprises an encryption processing module, a hash processing module and a signature algorithm processing module, but may also comprise other basic security processing modules under different application requirements, which is not restricted in the application.

After determining the security service transmission route according to Step 3, the basic security processing module within the router node corresponding to the security service transmission route may not be configured yet. Under the circumstance, configuration files of the security processing module stored in the router node facilitate achieving reconstruction and combination of the basic security processing module, and forming a combination sequence of an orderly basic security processing module that can provide security functions.

The connectionless packet switching channel can only provide the network service of "making the best efforts". When very high service quality is required, it is necessary to establish a macro-circuit path of virtual connection, which can reserve certain bandwidth for the transmission route, and can provide very high service quality guarantee. But due to very high requirement for establishing the macro-circuit path of virtual connection, the server usually analyzes and processes the business transmission requirement in the presence of a plurality of business transmission requirements, and divides the business transmission requirement into a plurality of types according to the business transmission demand. When the server determines that there are more than two business transmission requirements of the same business type according to the business transmission requirement, and the data reception terminal and data transmission terminal of the business transmission requirement are the same, the server generates a reconstruction order for reconstructing a macro-circuit path of virtual connection after determining that the service route reconstruction is necessary.

When the established service route is a macro-circuit path of virtual connection, the service route reconstruction according to the reconstruction order comprises:

Firstly, sending the reconstruction order transmitted by the server to the router node, and acquiring the reconstruction order corresponding to the business transmission according to current business transmission requirement information of the reconstruction order, wherein the reconstruction order comprises the macro-circuit parameters, and the macro-circuit parameters comprise the link circuit information, type and bandwidth requirements of the macro-circuit path of virtual connection to be established.

The server periodically generates the network resource view and the network flow rate view, and determines whether it is necessary to reconstruct a macro-circuit path of virtual connection, and whether to establish an intra-domain macro-circuit or an inter-domain macro-circuit according to its own running macro-circuit protocol and the network resource view and the network flow rate view. The intra-domain macro-circuit refers to a macro-circuit established within a single domain, and the inter-domain macro-circuit refers to the macro-circuit across a plurality of domains. After making a decision on reconstructing a macro-circuit path of virtual connection, the server sends a reconstruction order to each router node covered by the macro-circuit path of virtual connection to be established. The business transmission requirement in the reconstruction order comprises the macro-circuit parameters, and the micro-circuit parameters comprise the link circuit information, type and bandwidth requirement of the macro-circuit path of virtual connection to be established.

Secondly, determining whether the initial macro-circuit path of virtual connection satisfy the requirement of the macro-circuit parameters through adjustment according to the macro-circuit parameters in the reconstruction order; if so, adjusting the initial macro-circuit path of virtual connection, and acquiring the adjusted macro-circuit path of virtual connection.

Adjustment of the macro-circuit path of virtual connection comprises adjustment of the specification, performance and topology, and aims to reduce the influence of dynamic adjustment of macro-circuit path of virtual connection on current network. If the macro-circuit path of virtual connection to be established and an initial macro-circuit path of virtual connection before adjustment are in the same link circuit, and belong to the same type, it is only necessary to simply adjust the initial macro-circuit path of virtual connection, and then the router node can meet the requirements of the macro-circuit parameters according to the value of the macro-circuit parameters. In the case, a new macro-circuit path of virtual connection can be acquired through adjustment of the initial macro-circuit path of virtual connection. In addition, after successful adjustment, the router node covered by the new macro-circuit path of virtual connection sends an inter-domain macro-circuit adjustment notice to the server in the self-controlled domain as it. The inter-domain macro-circuit adjustment notice comprises the information of the new macro-circuit path of virtual connection, such as the link circuit information of the new macro-circuit path of virtual connection, corresponding type information and supporting bandwidth information, etc.

Thirdly, determining according to the judgment results that it is unable to meet the requirements of the macro-circuit parameters through specification adjustment, removing the initial macro-circuit path of virtual connection, and acquiring corresponding macro-circuit path of virtual connection through calculation according to the network resource view and the network flow rate view, as well as current business transmission requirement information.

When the business type carried by the initial macro-circuit path of virtual connection does not exist, or the business flow rate supported by it fails to reach the requirements for establishing a macro-circuit path of virtual connection, it is necessary to remove the initial macro-circuit path of virtual connection, in order to avoid the bandwidth waste.

Fourthly, acquiring the label switching base corresponding to the macro-circuit path of virtual connection, loading the label of each link circuit determined by the transmission route in the label switching base, or loading the label and service level information of each link circuit determined by the transmission route when current business transmission requirement information comprises the service level information required for the business transmission, and establishing a macro-circuit path of virtual connection through data transmission according to the label switching base.

Data transmission is carried out through the label switching base in a macro-circuit path of virtual connection, wherein, the identification of each link circuit is loaded in the label switching base, where every two router nodes form a link circuit.

When a service route is created, each router node transmits the link circuit identification corresponding to it to the server within the self-controlled domain in advance, so that the server acquires the link circuit identification of each router node within the self-controlled domain.

When current business transmission requirement information only comprises the link bandwidth information required for business transmission, it is only necessary to load the identification of each link circuit determined by the transmission route in the acquired label switching base. In the process of data transmission, data transmission is carried out according to the label switching base.

In addition, when the business transmission requirement information comprises the service level information required for the business transmission, each router node shall also inform the server within the self-controlled domain of their own link state information, as well as the service ability and security level that can be provided by themselves, in order to dynamically establish service routes satisfying the requirements of business and application of different service categories and security levels. In the case, the transmission route obtained through calculation still needs to meet the requirement of business transmission for service level, wherein, the service level comprises the service quality and security level. Therefore, the label switching base comprises the link circuit identification required for the business transmission, and is also loaded with the service level identification required for the business transmission. Through introduction of the service level, the label switching base can provide service routes satisfying the requirements of business and application of different service quality and security level requirements, and solves current problems of Internet in respect of the service quality and security, etc.

During data transmission, when current business transmission requirement information only comprises the link bandwidth information required for business transmission, it is only necessary to find necessary link circuit through list processing according to the link circuit identification loaded in the label switching base. If current business transmission requirement information comprises the link bandwidth information and service level required for the business transmission, it is necessary not only to acquire the required link circuit identification, but also to find the service level.

When current business transmission requirement information comprises the service level information required for the business transmission, corresponding macro-circuit path of virtual connection is acquired through calculation according to the network resource view and the network flow rate view, as well as current business transmission requirement information, comprising:

Firstly, determining the business security requirements required for the business transmission according to the service level information, and formulating corresponding security scheme according to the business security requirement, wherein the security scheme comprises the security service level, the security mechanism and security technology required for the business transmission;

Secondly, determining the transmission route with security service function according to the security resource information of each routing node comprised in the network resource view and the network flow rate view, as well as the security scheme; and Finally, determining whether itself is the router node corresponding to the security service transmission route, and if so, configuring corresponding basic security processing module according to the security processing module configuration files stored in itself, wherein, the basic security processing module comprises an encryption processing module, a hash processing module, and/or a signature algorithm processing module.

The basic security processing module refers to the basic security components in a router node. The software module in a router node mainly refers to the smallest functional unit for realizing network security, and is the basis for supporting network security function extension and service customization. The basic security processing module disclosed in the application comprises an encryption processing module, a hash processing module and a signature algorithm processing module, but may also comprise other basic security processing modules under different application requirements, which is not restricted in the application.

After determining the security service transmission route, the basic security processing module within the router node corresponding to the security service transmission route may not be configured yet. Under the circumstance, configuration files of the security processing module stored in the router node facilitate achieving reconstruction and combination of the basic security processing module, and forming a combination sequence of an orderly basic security processing module that can provide security functions.

Embodiment 3

In case of more transmission business, the application may realize establishment and reconstruction of the service route in the form of establishing a service bearer network.

Figure 6:
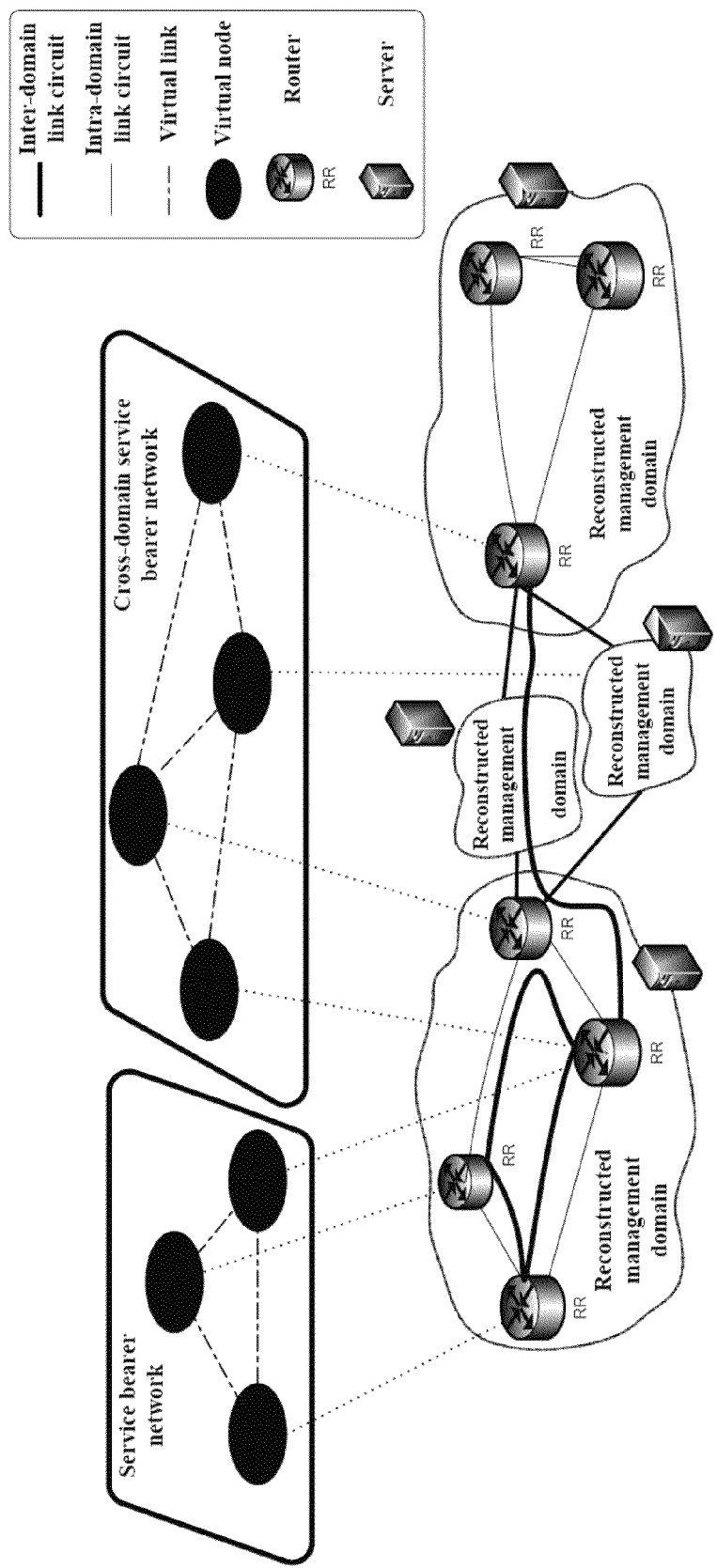
FIG. 6 shows a structure diagram of a service bearer network disclosed in the embodiments of the present invention.

As can be seen from the structure diagram of the service bearer network in FIG. 6, the service bearer network is composed of a plurality of virtual nodes, each virtual node is acquired by real router node and server mapping, and the link circuit composed of virtual nodes is a virtual link. The service bearer network is established in the following steps: firstly the server in each self-controlled domain collects the resource state of each router node; then the router node allocates corresponding underlying resources to corresponding virtual nodes through reasonable resource scheduling, and also establishes service routes for corresponding virtual links using the routing mechanism, so as to complete mapping from virtual topology to real network equipment.

In the operation process of the service bearer network, after a service route is established, the virtual nodes comprised in the service route are mapped to real router nodes, the virtual link is mapped to the real link, and the business transmission is carried out through real links.

Figure 7:
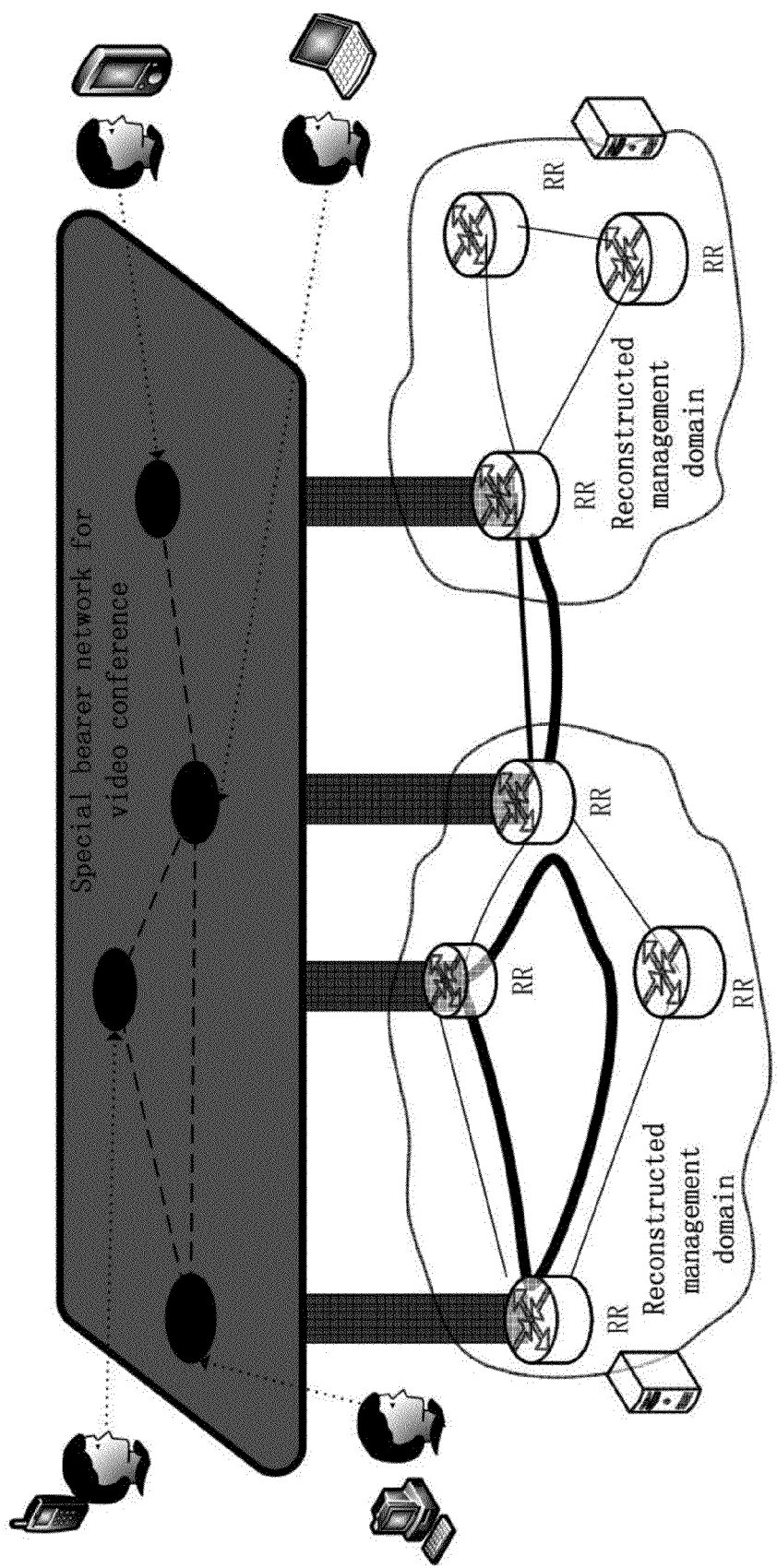
FIG. 7 shows a structure diagram of a service bearer network for a video conference disclosed in the embodiments of the present invention.

As can be seen from the structure diagram of the service bearer network in a video conference in FIG. 7, the video conference service is realized through the service bearer network with a video conference between 4 users as an example in the steps as follows:

Firstly, the staff collect each user needs, and formulate the request for establishing the service bearer network according to these requirements, wherein, the establishing request comprises the network topology, life cycle of the service bearer network, link bandwidth requirement of the video conference business, node computing power or exchange capacity requirement of the video conference business, etc.

Secondly, after receiving the request for establishing the service bearer network, the server will start a resource cognition process by firstly collecting the state information of each router node and then resource description of collected state information, comprising the basic node resources, computing resources, storage resources, communication resources, etc., in order to generate the network resource view. Besides, the server starts the flow state perception operation. The router node samples the flow rate on each link circuit in the domain, and then acquires the type information and the flow rate information of all kinds of business carried on the link circuit through business identification. The router node transmits the information to the server, and the server establishes the network flow rate view, wherein, the router nodes in the network resource view and the network flow rate view correspond to virtual nodes. The network resource view comprises the resource information of each virtual node, each link state information and topology connection information. The network flow rate view comprises the flow rate information of various virtual links.

Thirdly, through analysis of the network resource view and the network flow rate view, the server searches the underlying network node equipment that can meet the processing requirements of the video conference service, and selects the transmission network meeting the business requirement through reasonable planning.

Fourthly, calculating the service route in the transmission network according to the network resource view, the network flow rate view, and the requirement information of the business transmission. The service route is a virtual service route composed of virtual links consisting of virtual nodes.

Fifthly, transmitting the mapping order (comprising the node mapping order and service route mapping order) to each router node, wherein, the node mapping is used to map the virtual nodes in the service bearer network to a real node, such as a router node or a server. The service route mapping is used to map the service route, namely the virtual route, between various virtual nodes in the bearer network to one or more real network links.

Sixthly, the user need changes or great changes of the equipment running state will trigger the reconstruction mechanism of the service bearer network. The server compares the real transmission performance of the business flow rate with the transmission performance requirement, acquires a reconstruction order through calculation, and transmits the reconstruction order to real route nodes, which reconstruct the service route.

Seventhly, if the reconstructed service route still fails to meet the requirement, the service bearer network will be remapped, that is, replanning the mapping scheme of the service node or service route, finding feasible mapping scheme, and selecting the optimal scheme for remapping.

In the service bearer network, the router nodes and servers are mapped to virtual nodes, where each virtual node corresponds to a business transmission requirement, allocates reasonable resource information and flow rate information to each virtual node, and creates a service route according to the resource information and the flow rate information of each virtual node. In data transmission, the mapping order generated by the server maps the virtual node to real nodes. For example, the router nodes and servers map virtual links to real links, and transmit data information through real links.

After establishing the service bearer network, when there are a plurality of transmission business, the real nodes are virtualized, so as to acquire virtual nodes corresponding to the transmission business, reasonably allocate the resource and the flow rate information of each virtual node, and obtain the service routes of a plurality of transmission business.

Embodiment 4

Figure 8:
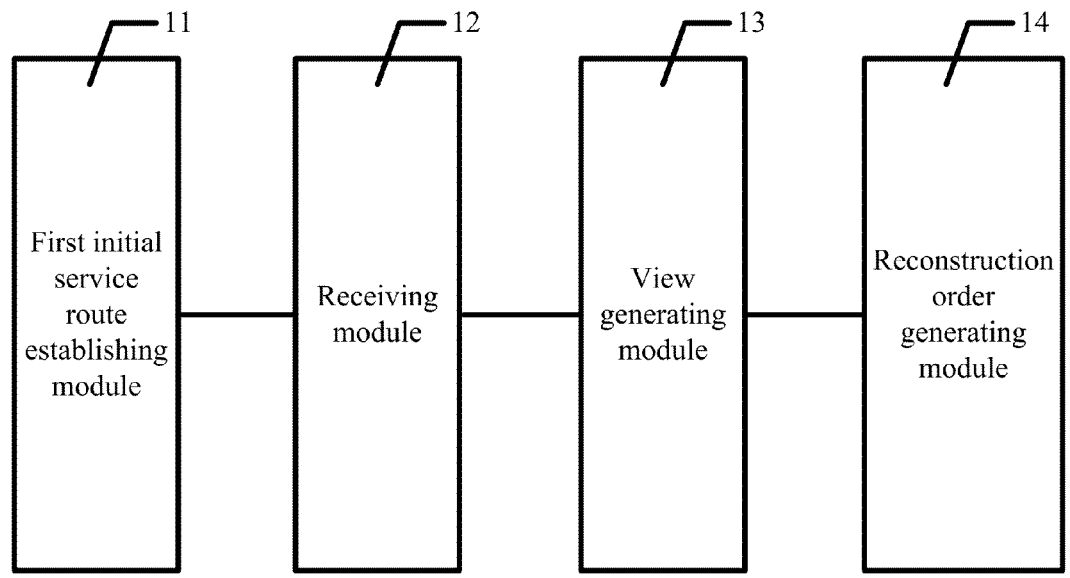
FIG. 8 shows a structure diagram of a device for establishing an information communication network system structure disclosed in the embodiments of the present invention.

The embodiment 4 of the present invention also discloses a device for establishing an information communication network system structure. According to the structure diagram in FIG. 8, the device for establishing an information communication network system structure comprises: a first initial service route establishing module 11, a receiving module 12, a view generating module 13 and a reconstruction order generating module 14, wherein:

The receiving module 12, used to receive current network resource configuration information and flow rate state information periodically transmitted by each router node in a self-controlled domain after the first initial service route establishing module 11 establishes the initial service route, wherein the network resource configuration information comprises node resource and state information of the router node, topology information and basic component information of network, and the flow rate state information comprises a business type and flow rate information carried by a link circuit corresponding to the router node;

The view generating module 13, used to respectively generate network resource view and network flow rate view according to current network resource configuration information and flow rate state information, wherein the network resource view comprises resource information of each router node, each link state information and topology connection information, and the network flow rate view comprises the flow rate information of the link circuit corresponding to each router node; and The reconstruction order generating module 14, used to acquire current real transmission performance of the initial service route according to the network resource view and the network flow rate view, compare the real transmission performance with current business transmission requirement, and generate a reconstruction order when the real transmission performance is different from the business transmission requirement, wherein the reconstruction order comprises current business transmission requirement information, the network resource view and the network flow rate view, so that the router node receiving the reconstruction order reconstructs a service route, where the service route comprises the connectionless packet switching channel and the macro-circuit path of virtual connection.

The first initial service route establishing module 11 further comprises:

A business transmission requirement receiving unit, used to receive business transmission requirement, analyze and process the business transmission requirement, divide the business transmission requirement into a plurality of types according to the business transmission demand, and acquire the business type information corresponding to the business transmission requirement; wherein the business transmission requirement comprises the network topology information and the business transmission requirement information;

A router startup unit, used to generate resource cognition order and flow rate state perception order after receiving the business transmission requirement, and transmit the resource cognition order and flow rate state perception order to each router node in the self-controlled domain, so that the router node respectively transmits current network resource configuration information and flow state information every other scheduled primary cycle and secondary cycle after receiving the resource cognition order and the flow state perception order;

An initial view generating unit, used to receive the network resource configuration information and the flow rate state information, and generate corresponding network resource view and network flow rate view according to the network resource configuration information and the flow rate state information; and An initial service route establishing unit, used to transmit the network resource view, the network flow rate view, the business transmission requirement and the business type information to each router node, so that the router node generates corresponding initial service route accordingly, wherein the initial service route comprises the connectionless packet switching channel and the macro-circuit path of virtual connection.

According to the above disclosed device for establishing the information communication network system structure, after establishing the initial service route, the server continues to periodically acquire current network resource configuration information and flow rate state information transmitted by each router node, and generate the network resource view and the network flow rate view; the server acquires current real transmission performance of the initial service route according to the network resource view and the network flow rate view; compare current real transmission performance with current business transmission requirement, and generate a reconstruction order when both do not match with each other, so that the router node actuates the operation for reconstructing a service route after receiving the reconstruction order, the reconstructed service route is ensured to meet the function and performance requirement of network service, and the self-adaptive matching of the network transmission capacity and service requirement can be realized.

Through reconstructing a service route, the device can provide the business with a transmission channel adapted to the requirement and with quality and security guarantee. The communication network system structure established in the application is reconstructable and can realize self-adaptive dynamic adjustment and global optimization of the service features by the network structure and function, so as to improve the adaptability of the network transmission capacity to the business requirement, meet the real requirement caused by business expansion, and guarantee the service quality of network business.

In addition, the communication network system structure established in the scheme has a multidimensional cognition coordination mechanism, generates the network resource view and the network flow rate view corresponding to the self-controlled domain according to the network resource configuration information and the flow rate information acquired from each router node, and realize dynamic perception and intelligent collaboration between network and business and between a variety of unit functions within network based on the inherent ability such as self-learning, self-adaption, self-management and self-evolution from local to global network.

Accordingly, the present invention also discloses a server, wherein, a chip of the server is integrated with the above device for establishing the information communication network system structure.

Embodiment 5

Figure 9:
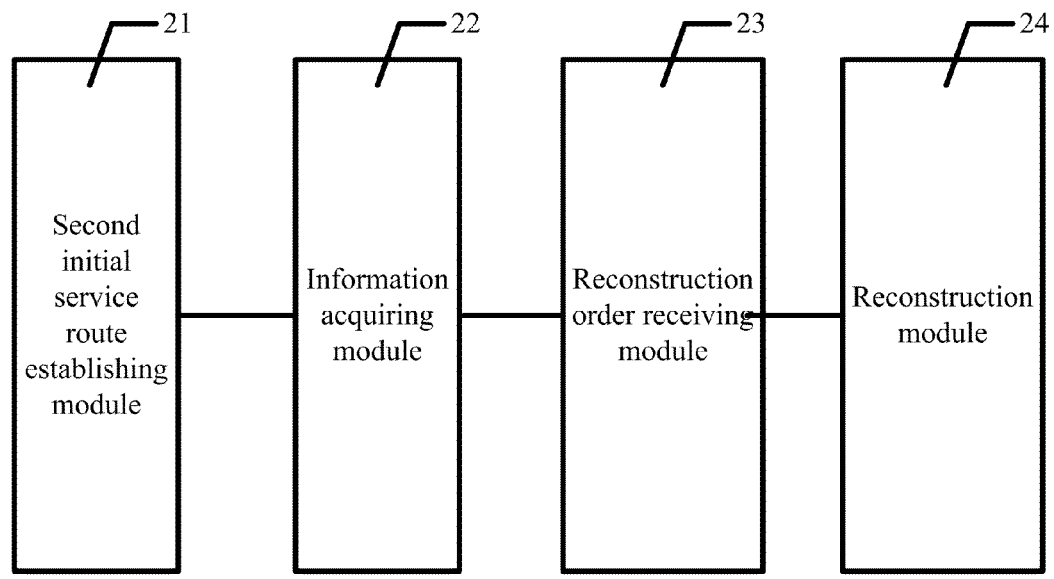
FIG. 9 shows a structure diagram of another device for establishing an information communication network system structure disclosed in the embodiments of the present invention.

The embodiment 5 of the present invention discloses a device for establishing an information communication network system structure. According to the structure diagram in FIG. 9, the device for establishing an information communication network system structure comprises: a second initial service route establishing module 21, an information acquisition module 22, a reconstruction order receiving module 23 and a reconstruction module 24, wherein:

The information acquisition module 22, used to respectively acquire current network resource configuration information and flow rate state information every other scheduled primary cycle and secondary cycle after the second initial service route establishing module 21 establishes the initial service route, and transmit network resource configuration information and flow rate information to a server, so that the server generates network resource view and network flow rate view according to current network resource configuration information and flow rate state information, and generates corresponding reconstruction order through the network resource view and the network flow rate view; wherein the network resource configuration information comprises node state information of router node, topology information and basic component information of network, and the flow rate state information comprises a business type and the flow rate information carried by a link circuit corresponding to the router node;

The reconstruction order receiving module 23, used to receive the reconstruction order transmitted by the server, wherein the reconstruction order comprises current business transmission requirement information, the network resource view and the network flow rate view; and The reconstruction module 24, used to reconstruct a service route according to the reconstruction order, where the service route comprises a connectionless packet switching channel and a macro-circuit path of virtual connection.

The second initial service route establishing module further comprises:

A receiving unit, used to receive resource cognition order and flow rate state perception order transmitted by the server;

An initial information acquisition module, used to respectively acquire current network resource configuration information and flow rate state information every other scheduled primary cycle and secondary cycle according to the resource cognition order and the flow rate state perception order, and transmit current network resource configuration information and flow rate state information to the server, so that the server generates corresponding network resource view and network flow rate view after receiving the network resource configuration information and the flow rate state information, wherein the network resource view comprises the resource information of each router node, each link state information and topology connection information, and the network flow rate view comprises the flow rate information of the link circuit corresponding to each router node; and A second initial service route establishing unit, used to receive the network resource view, the network flow rate view, the business transmission requirement information and the business type information transmitted by the server, and generate corresponding initial service route accordingly, wherein the initial service route comprises a connectionless packet switching channel and a macro-circuit path of virtual connection.

When the established service route is a connectionless packet switching channel, the reconstruction module further comprises:

An order receiving unit, used to determine the communication subject type corresponding to the business transmission according to current business transmission requirement information of the reconstruction order after receiving the reconstruction order transmitted by the server, and acquire the identification value of data transmission terminal and data reception terminal corresponding to the communication subject type, wherein the communication subject type comprises location, identification, service, and content;

A first route acquiring unit, used to determine the routing and addressing agreement according to the network resource view and the network flow rate view, as well as current business transmission requirement information, and acquire corresponding transmission route through calculation according to the routing and addressing agreement; and A first establishing unit, used to acquire the forwarding information base corresponding to the communication subject type, load the identification of the communication subject type of the router node determined by the transmission route in the forwarding information base, or load the identification and service level information of the communication subject type corresponding to the router node determined by the transmission route when current business transmission requirement information comprises the service level information required for the business transmission, and establish a connectionless packet switching channel through data transmission according to the forwarding information base.

When current business transmission requirement information comprises the service level information required for the business transmission, the first route acquiring unit further comprises:

A first security scheme formulating subunit, used to determine the business security requirement required for the business transmission according to the service level information, and formulate corresponding security scheme according to the business security requirement, wherein security scheme comprises security service level, security mechanism and security technology required for the business transmission;

A first determination subunit, used to determine the transmission route with security service function according to the security resource information of each routing node of the network resource view and the network flow rate view, as well as the security scheme; and A first configuration subunit, used to determine whether itself is the router node corresponding to the security service transmission route, and if so, configure corresponding basic security processing module according to the security processing module configuration files stored in itself, wherein, the basic security processing module comprises an encryption processing module, a hash processing module, and/or a signature algorithm processing module.

When the established service route is a macro-circuit of virtual connection, the reconstruction module 24 further comprises:

A second receiving unit, used to receive the reconstruction order transmitted by the server, and acquire macro-circuit parameters of current business transmission requirement information according to current business transmission requirement information of the reconstruction order, wherein the macro-circuit parameters comprise the link circuit information, type and bandwidth requirements of the macro-circuit path of virtual connection to be established;

A second judging unit, used to judge whether the initial macro-circuit path of virtual connection can meet the requirements of the macro-circuit parameters through adjustment according to the macro-circuit parameters in the reconstruction order; if so, adjust the initial macro-circuit path of virtual connection, and acquire the adjusted macro-circuit path of virtual connection;

A second route acquiring unit, used to remove the initial macro-circuit path of virtual connection if it is determined according to the judgment result that it is unable to meet the requirements of the macro-circuit parameters through specification adjustment, and acquire corresponding macro-circuit path of virtual connection through calculation according to the network resource view and the network flow rate view, as well as current business transmission requirement information; and A second establishing unit, used to acquire the label switching base corresponding to the macro-circuit path of virtual connection, load the label of each link circuit determined by the transmission route in the label switching base, or load the label and service level information of each link circuit determined by the transmission route when current business transmission requirement information comprises the service level information required for the business transmission, and establish a macro-circuit path of virtual connection through data transmission according to the label switching base.

When current business transmission requirement information comprises the service level information required for the business transmission, the second route acquiring unit further comprises:

A second security scheme formulating subunit, used to determine the business security requirement required for the business transmission according to the service level information, and formulate corresponding security scheme according to the business security requirement, wherein the security scheme comprises the security service level, the security mechanism and security technology required for the business transmission;

A second determination subunit, used to determine the transmission route with security service function according to the security resource information of each routing node of the network resource view and the network flow rate view, as well as the security scheme; and A second configuration subunit, used to determine whether itself is the router node corresponding to the security service transmission route, and if so, configure corresponding basic security processing module according to the security processing module configuration files stored in itself, wherein, the basic security processing module comprises an encryption processing module, a hash processing module, and/or a signature algorithm processing module.

Accordingly, the present invention also discloses a router, wherein, a chip of the server is integrated with the above device for establishing the information communication network system structure.

Ordinary technical personnel in the field can realize that, the unit and algorithm steps in each embodiment of the samples disclosed in the document can be realized by way of electronic hardware, or a combination of computer software and electronic hardware. Whether these functions are actuated by hardware or software depends on the specific applications and design constraints of the technical scheme. Specialized technical personnel can realize provided functions of each specific application using different methods, but such realization should not be considered as going beyond the scope of the present invention.

The technical personnel in the field can clearly understand that for the sake of convenient and concise description, the specific work process of the above system, device and unit can follow corresponding process in the above embodiments, and is no longer repeated here.

It should be understood from a few embodiments provided in the application that the revealed system, device and method may be realized in some other way. For example, the device provided in above embodiments is only illustrative. For example, the unit is divided just as per the logical function, and may be divided in some other way in real realization. For example, a plurality of units or components may be combined or integrated into another system, or some characteristics may be neglected or may not be actuated. Besides, the revealed or discussed mutual coupling or direct coupling or communication connection may be indirect coupling or communication connection through some interface, device or unit in electrical, mechanical, or other forms.

The unit provided as a separate component may be or may not be physically separated. The unit display component may be or may not be a physical unit, that is, it may be located in one place, or may also be distributed to a plurality of network units. The purpose of the scheme in the embodiment may be realized by selecting part of or all units thereof according to the real needs.

In addition, various functional units in each embodiment of the present invention may be integrated into a processing unit, or each unit may also be physically separated, or two or more than two units may also be integrated into a unit.

If the function is realized in the form of a software function unit and put on the market or used as a separate product, it can be stored in a computer readable storage medium. Based on such understanding, the technical scheme of the prevent invention or part of the technical scheme contributing to the prior art or part of the technical scheme can be substantially reflected in the form of a software product. The computer software products are stored in a storage medium, comprising a number of orders to allow a computer (may be a personal computer, a server, or a network device, etc.) to actuate all or part of the process of the methods provided in each embodiment of the present invention. The above storage medium comprises all kinds of media that can store program codes, such as a U disk, a mobile hard disk, a read-only memory (ROM), a random access memory (RAM), a disk or a CD etc.

The above description of the disclosed embodiments allows the specialized technical personnel in the field to realize or use the present invention. A variety of modifications of these embodiments will be very obvious for specialized technical personnel in the field. The general principle defined in the document may be realized in other embodiments without departure from the spirit or scope of the present invention. Therefore, the present invention will not be limited to these embodiments provided in the document, but shall follow the widest range according to the principle and novelty disclosed in the document.

The invention claimed is:

1. A method for establishing an information communication network system structure, the method comprising:

establishing an initial service route by a server, the server being disposed in a self-controlled domain;

acquiring current network resource configuration information and flow rate state information periodically transmitted by each router node in the self-controlled domain, wherein the network resource configuration information comprises node resource and state information of the router node, topology information, and basic component information of network, and the flow rate state information comprises a business type and flow rate information carried by a link circuit corresponding to the router node;

generating network resource view and network flow rate view respectively according to current network resource configuration information and flow rate state information, wherein the network resource view comprises resource information of each route node, each link state information, and topology connection information, and the network flow rate view comprises the flow rate information of the link circuit corresponding to each router node; and acquiring current real transmission performance of the initial service route according to the network resource view and the network flow rate view, comparing current real transmission performance of the initial service route with current business transmission requirement, and generating a reconstruction order when the real transmission performance does not match the business transmission requirement; wherein the reconstruction order comprises current business transmission requirement information, the network resource view, and the network flow rate view, so that the router node receiving the reconstruction order reconstructs a service route, wherein the service route comprises a connectionless packet switching channel and a macro-circuit path of virtual connection.

2. The method of claim 1, wherein the steps of establishing the initial service route comprises:
receiving the business transmission requirement by the server, wherein the business transmission requirement comprises network topology information and business transmission requirement information; analyzing and processing the business transmission requirement; dividing the business transmission requirement into a plurality of types according to the business transmission demand; and acquiring business type information corresponding to the business transmission requirement;
generating a resource cognition order and a flow rate state perception order, transmitting the resource cognition order and the flow rate state perception order to each router node in the self-controlled domain; receiving the resource cognition order and the flow rate state perception order by the router node, so that the router node respectively transmits current network resource configuration information and flow rate state information every other scheduled primary cycle and secondary cycle;
receiving the network resource configuration information and the flow rate state information, and generating corresponding network resource view and network flow rate view according to the network resource configuration information and the flow rate state information; and transmitting the network resource view, the network flow rate view, the business transmission requirement and the business type information to each router node, so that the router node generates corresponding initial service route accordingly, wherein the initial service route comprises the connectionless packet switching channel and the macro-circuit path of virtual connection.

3. A method for establishing an information communication network system structure, comprising:
establishing an initial service route by a router node;
acquiring current network resource configuration information and flow rate state information every other scheduled primary cycle and secondary cycle respectively by the router node, wherein the network resource configuration information comprises node state information of the router node, topology information, and basic component information of network, the flow rate state information comprises a business type and flow rate information carried by a link circuit corresponding to the router node;
transmitting the network resource configuration information and the flow rate information to a server, so that the server generates network resource view and network flow rate view according to current network resource configuration information and flow rate state information; generating corresponding reconstruction order through the network resource view and the network flow rate view;
receiving the reconstruction order transmitted by the server, wherein the reconstruction order comprises current business transmission requirement information, the network resource view, and the network flow rate view; and
reconstructing a service route according to the reconstruction order, wherein the service route comprises a connectionless packet switching channel and a macro-circuit path of virtual connection.

4. The method of claim 3, wherein the steps of establishing the initial service route comprises:
sending the resource cognition order and the flow rate state perception order transmitted by the server to the router node;
acquiring current network resource configuration information and flow rate state information every other scheduled primary cycle and secondary cycle respectively according to the resource cognition order and the flow rate state perception order, and transmitting current network resource configuration information and flow rate state information to the server; receiving the network resource configuration information and the flow rate state information by the server, so that the server generates corresponding network resource view and network flow rate view, wherein the network resource view comprises the resource information of each router node, various link state information, and the topology connection information, and the network flow rate view comprises the flow rate information of the link circuit corresponding to each router node; and
receiving the network resource view, the network flow rate view, the business transmission requirement information and the business type information transmitted by the server, and generating corresponding initial service route accordingly, wherein the initial service route comprises the connectionless packet switching channel and the macro-circuit path of virtual connection.

5. The method of claim 3, wherein:
the connectionless packet switching channel is a basic data transmission channel realizing the data transmission function by a network in the form of the connectionless packet switching; and
the macro-circuit path of virtual connection is a data transmission channel intelligently and dynamically established by the network according to the application requirement and network state and with the macro-circuit as the basic data transmission mode, wherein the macro-circuit is a self-adaptive virtual circuit dynamically established by a set of similar business flows with a common transmission route.

6. The method of claim 4, wherein:
the connectionless packet switching channel is a basic data transmission channel realizing the data transmission function by a network in the form of the connectionless packet switching; and
the macro-circuit path of virtual connection is a data transmission channel intelligently and dynamically established by the network according to the application requirement and network state and with the macro-circuit as the basic data transmission mode, wherein the macro-circuit is a self-adaptive virtual circuit dynamically established by a set of similar business flows with a common transmission route.

7. The method of claim 3, wherein, when the established service route is a connectionless packet switching channel, the service route reconstruction according to the reconstruction order comprises:
sending the reconstruction order transmitted by the server to the router node;
determining the communication subject type corresponding to the business transmission according to current business transmission requirement information of the reconstruction order by the router node, and acquiring the identification value of data transmission terminal and data reception terminal corresponding to the communication subject type, wherein the communication subject type comprises location, identification, service, and content;

determining the routing and addressing agreement according to the network resource view and the network flow rate view, as well as current business transmission requirement information, and acquiring corresponding transmission route through calculation according to the routing and addressing agreement; and acquiring the forwarding information base corresponding to the communication subject type, loading the communication subject type identification of the router node determined by the transmission route in the forwarding information base, or loading the identification and service level information of the communication subject type corresponding to the router node determined by the transmission route when current business transmission requirement information comprises the service level information required for the business transmission, and establishing the connectionless packet switching channel through data transmission according to the forwarding information base.

8. The method of claim 7, wherein, when current business transmission requirement information comprises the service level information required for the business transmission, corresponding transmission route acquired through calculation according to the routing and addressing agreement comprises:

determining the business security requirements required for the business transmission according to the service level information, and formulating corresponding security scheme according to the business security requirements, wherein the security scheme comprises security service level, security mechanism and security technology required for the business transmission;

determining the transmission route with security service function according to the security resource information of each routing node of the network resource view and the network flow rate view, as well as the security scheme; and determining whether itself is the router node corresponding to the security service transmission route, and if so, configuring corresponding basic security processing module according to the security processing module configuration files stored in itself.

9. The method of claim 3, wherein, when the established service route is the macro-circuit path of virtual connection, the service route reconstruction according to the reconstruction order comprises:

sending the reconstruction order transmitted by the server to the router node, and acquiring the macro-circuit parameters of current business transmission requirement information according to current business transmission requirement information of the reconstruction order, wherein the macro-circuit parameters comprise the link circuit information, type and bandwidth requirements of the macro-circuit path of virtual connection to be established;

determining whether the initial macro-circuit path of virtual connection meet the needs of the macro-circuit parameters through adjustment according to the macro-circuit parameters in the reconstruction order; if so, adjusting the initial macro-circuit path of virtual connection, and acquiring the adjusted macro-circuit path of virtual connection;

determining according to the judgment result that it is unable to meet the requirements of the macro-circuit parameters through specification adjustment, removing the initial macro-circuit path of virtual connection, and acquiring corresponding macro-circuit path of virtual connection through calculation according to the network resource view and the network flow rate view, as well as current business transmission requirement information; and acquiring the label switching base corresponding to the macro-circuit path of virtual connection, loading the label of each link circuit determined by the transmission route in the label switching base, or loading the label and service level information of each link circuit determined by the transmission route when current business transmission requirement information comprises the service level information required for the business transmission, and establishing a macro-circuit path of virtual connection through data transmission according to the label switching base.

10. The method of claim 9, wherein, when current business transmission requirement information comprises the service level information required for the business transmission, corresponding macro-circuit path of virtual connection is acquired through calculation according to the network resource view and the network flow rate view, as well as current business transmission requirement information, comprising:

determining the business security requirements required for the business transmission according to the service level information, and formulating corresponding security scheme according to the business security requirements, wherein the security scheme comprises the security service level, the security mechanism and security technology required for the business transmission;

determining the transmission route with security service function according to the security resource information of each routing node of the network resource view and the network flow rate view, as well as the security scheme; and determining whether itself is the router node corresponding to the security service transmission route, and if so, configuring corresponding basic security processing module according to the security processing module configuration files stored in itself.

11. A device for performing the method of claim 1, the device comprising:

a receiving module, used to receive current network resource configuration information and flow rate state information periodically transmitted by each router node in the self-controlled domain after the first initial service route establishing module establishes the initial service route;

a view generating module, used to respectively generate the network resource view and the network flow rate view according to current network resource configuration information and flow rate state information; and a reconstruction order generating module, used to acquire current real transmission performance of the initial service route according to the network resource view and the network flow rate view, compare the real transmission performance with current business transmission requirement, and generate the reconstruction order when the real transmission performance does not match the business transmission requirement.

12. A device for performing the method of claim 2, wherein a first initial service route establishing module comprises:

a business transmission requirement receiving unit, used to receive the business transmission requirement, analyze and process the business transmission requirement, divide the business transmission requirement into a plurality of types according to the business transmission demand, and acquire the business type information corresponding to the business transmission requirement;

a router startup unit, used to generate the resource cognition order and the flow rate state perception order after receiving the business transmission requirement, and transmit the resource cognition order and the flow rate state perception order to each router node in the self-controlled domain, so that the router node respectively transmits current network resource configuration information and flow state information every other scheduled primary cycle and secondary cycle after receiving the resource cognition order and the flow state perception order;

an initial view generating unit, used to receive the network resource configuration information and the flow rate state information, and generate corresponding network resource view and network flow rate view according to the network resource configuration information and the flow rate state information; and an initial service route establishing unit, used to transmit the network resource view, the network flow rate view, the business transmission requirement and the business type information to each router node, so that the router node generates corresponding initial service route accordingly.

13. A device for establishing an information communication network system structure, the device comprising:

an information acquisition module, used to respectively acquire current network resource configuration information and flow rate state information every other scheduled primary cycle and secondary cycle after a second initial service route establishing module establishes an initial service route, and transmit the network resource configuration information and the flow rate information to a server, so that the server generates network resource view and network flow rate view according to current network resource configuration information and flow rate state information, and generates corresponding reconstruction order through the network resource view and the network flow rate view; wherein the network resource configuration information comprises node state information of router node, topology information, and basic component information of network, and the flow rate state information comprises a business type and the flow rate information carried by a link circuit corresponding to the router node;

a reconstruction order receiving module, used to receive the reconstruction order transmitted by the server, wherein the reconstruction order comprises current business transmission requirement information, the network resource view, and the network flow rate view; and a reconstruction module, used to reconstruct a service route according to the reconstruction order, wherein the service route comprises a connectionless packet switching channel and a macro-circuit path of virtual connection.

14. The device of claim 13, wherein the second initial service route establishing module comprises:

a receiving unit, used to receive resource cognition order and flow rate state perception order transmitted by the server;

an initial information acquisition module, used to respectively acquire current network resource configuration information and flow rate state information every other scheduled primary cycle and secondary cycle according to resource cognition order and flow rate state perception order, and transmit current network resource configuration information and flow rate state information to the server, so that the server generates corresponding network resource view and network flow rate view after receiving the network resource configuration information and the flow rate state information, wherein the network resource view comprises the resource information of each router node, each link state information, and topology connection information, and the network flow rate view comprises the flow rate information of the link circuit corresponding to each router node; and a second initial service route establishing unit, used to receive the network resource view, the network flow rate view, the business transmission requirement information and the business type information transmitted by the server, and generate corresponding initial service route accordingly, wherein the initial service route comprises the connectionless packet switching channel and the macro-circuit path of virtual connection.

15. The device of claim 13, wherein, when the established service route is a connectionless packet switching channel, the reconstruction module comprises:

an order receiving unit, used to determine the communication subject type corresponding to the business transmission according to current business transmission requirement information of the reconstruction order after receiving the reconstruction order transmitted by the server, and acquire the identification value of data transmission terminal and data reception terminal corresponding to the communication subject type, wherein the communication subject type comprises location, identification, service, and content;

a first route acquiring unit, used to determine the routing and addressing agreement according to the network resource view and the network flow rate view, as well as current business transmission requirement information, and acquire corresponding transmission route through calculation according to the routing and addressing agreement; and a first establishing unit, used to acquire the forwarding information base corresponding to the communication subject type, load the identification of the communication subject type of the router node determined by the transmission route in the forwarding information base, or load the identification and service level information of the communication subject type corresponding to the router node determined by the transmission route when current business transmission requirement information comprises the service level information required for the business transmission, and establish a connectionless packet switching channel through data transmission according to the forwarding information base.

16. The device of claim 15, wherein, when current business transmission requirement information comprises the service level information required for the business transmission, the first route acquiring unit comprises:

a first security scheme formulating subunit, used to determine the business security requirement required for the business transmission according to the service level information, and formulate corresponding security scheme according to the business security requirement, wherein the security scheme comprises security service level, security mechanism and security technology required for the business transmission;

a first determination subunit, used to determine the transmission route with security service function according to the security resource information of each routing node of the network resource view and the network flow rate view, as well as the security scheme; and a first configuration subunit, used to determine whether itself is the router node corresponding to the security service transmission route, and if so, configure corresponding basic security processing module according to the security processing module configuration files stored in itself.

17. The device of claim 13, wherein, when the established service route is a macro-circuit of virtual connection, the reconstruction module comprises:

a second receiving unit, used to receive the reconstruction order transmitted by the server, and acquire macro-circuit parameters of current business transmission requirement information according to current business transmission requirement information of the reconstruction order, wherein the macro-circuit parameters comprise the link circuit information, type and bandwidth requirements of the macro-circuit path of virtual connection to be established;

a second judging unit, used to judge whether the initial macro-circuit path of virtual connection meet the requirements of the macro-circuit parameters through adjustment according to the macro-circuit parameters in the reconstruction order; if so, adjust the initial macro-circuit path of virtual connection, and acquire the adjusted macro-circuit path of virtual connection;

a second route acquiring unit, used to remove the initial macro-circuit path of virtual connection if it is determined according to the judgment result that it is unable to meet the requirements of the macro-circuit parameters through specification adjustment, and acquire corresponding macro-circuit path of virtual connection through calculation according to the network resource view and the network flow rate view, as well as current business transmission requirement information; and a second establishing unit, used to acquire the label switching base corresponding to the macro-circuit path of virtual connection, load the label of each link circuit determined by the transmission route in the label switching base, or load the label and service level information of each link circuit determined by the transmission route when current business transmission requirement information comprises the service level information required for the business transmission, and establish a macro-circuit path of virtual connection through data transmission according to the label switching base.

18. The device of claim 17, wherein, when current business transmission requirement information comprises the service level information required for the business transmission, the second route acquiring unit comprises:

a second security scheme formulating subunit, used to determine the business security requirement required for the business transmission according to the service level information, and formulate corresponding security scheme according to the business security requirement, wherein the security scheme comprises the security service level, the security mechanism and security technology required for the business transmission;

a second determination subunit, used to determine the transmission route with security service function according to the security resource information of each routing node of the network resource view and the network flow rate view, as well as the security scheme; and a second configuration subunit, used to determine whether itself is the router node corresponding to the security service transmission route, and if so, configure corresponding basic security processing module according to the security processing module configuration files stored in itself.

19. A server, wherein a chip of the server is integrated with the device for establishing the information communication network system structure of claim 11.

20. A router, wherein a chip of the server is integrated with the device for establishing the information communication network system structure of claim 13.

* * * * *